US009215694B2

United States Patent
Chen et al.

(10) Patent No.: US 9,215,694 B2
(45) Date of Patent: Dec. 15, 2015

(54) REFERENCE SIGNALS DESIGN FOR TIME TRACKING IN LTE-A

(71) Applicant: QUALCOMM Incorporated, San Diego, CA (US)

(72) Inventors: Wanshi Chen, San Diego, CA (US); Tao Luo, San Diego, CA (US); Yi Huang, San Diego, CA (US); Peter Gaal, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 155 days.

(21) Appl. No.: 13/714,181

(22) Filed: Dec. 13, 2012

(65) Prior Publication Data

US 2013/0163530 A1 Jun. 27, 2013

Related U.S. Application Data

(60) Provisional application No. 61/579,428, filed on Dec. 22, 2011, provisional application No. 61/600,190, filed on Feb. 17, 2012, provisional application No. 61/625,577, filed on Apr. 17, 2012.

(51) Int. Cl.
H04W 72/04 (2009.01)
H04L 27/26 (2006.01)
H04L 5/00 (2006.01)

(52) U.S. Cl.
CPC ........... *H04W 72/04* (2013.01); *H04L 27/2613* (2013.01); *H04L 5/0007* (2013.01); *H04L 5/0051* (2013.01); *H04L 27/2665* (2013.01)

(58) Field of Classification Search
CPC .............................. H04W 60/00; H04W 72/04
USPC ......................................................... 370/329
See application file for complete search history.

(56) References Cited

U.S. PATENT DOCUMENTS 8,743,813 B2 * 6/2014 Liu et al. .................... 370/329
9,025,487 B2 * 5/2015 Hugl et al. ................. 370/252

(Continued)

FOREIGN PATENT DOCUMENTS

WO 2011032033 A2 3/2011

OTHER PUBLICATIONS

Alcatel-Lucent Shanghai Bell et al., "Multi-cell cooperative RS in CaMP," 3GPP Draft; R1-092158 DL RS for Comp. 3rd Generation Partnership Project (3GPP). Mobile Competence Centre; 650. Route Des Lucioles; F-06921 Sophia-Antipolis Cedex; France. No. San Francisco. USA; 20090428. Apr. 28, 2009. XP050339598. [retrieved on Apr. 28, 2009].

(Continued)

*Primary Examiner* — Hassan Kizou
*Assistant Examiner* — Deepa Belur
(74) *Attorney, Agent, or Firm* — Arent Fox LLP

(57) ABSTRACT

Time tracking in current communication systems may be traditionally based on common reference signals (CRS). However, in certain communication systems, CRS-based time tracking may be impossible to implement due to an absence of CRS in certain subframes or carriers. CRS-based time tracking may also be inappropriate to implement in certain communication systems such as a coordinated multi-point (CoMP) system where control and data may arrive from different cells, and therefore, a UE may assume a wrong cell for CRS-based time tracking. Accordingly, methods, apparatuses, and computer program products for wireless communication are provided in which additional UE specific reference signals (UE-RS) and/or channel state information reference signals (CSI-RS) are made available to the UE so that the UE may have improved channel estimation and/or time tracking performance.

98 Claims, 23 Drawing Sheets

(56) References Cited

U.S. PATENT DOCUMENTS

| | | | |
|---|---|---|---|
| 2010/0232488 A1 | 9/2010 | Song et al. | |
| 2011/0092231 A1 | 4/2011 | Yoo et al. | |
| 2011/0098054 A1* | 4/2011 | Gorokhov et al. | 455/452.1 |
| 2011/0103247 A1 | 5/2011 | Chen et al. | |
| 2011/0216842 A1 | 9/2011 | Zhang et al. | |
| 2011/0268050 A1* | 11/2011 | Farajidana et al. | 370/329 |
| 2011/0268062 A1 | 11/2011 | Ji et al. | |
| 2012/0021688 A1* | 1/2012 | Bhattad et al. | 455/63.1 |
| 2012/0099544 A1* | 4/2012 | Pajukoski et al. | 370/329 |
| 2012/0163319 A1 | 6/2012 | Roessel et al. | |
| 2012/0182956 A1* | 7/2012 | Liu et al. | 370/329 |
| 2013/0194943 A1* | 8/2013 | Davydov et al. | 370/252 |
| 2013/0223271 A1* | 8/2013 | Huang et al. | 370/252 |
| 2013/0235769 A1* | 9/2013 | Yuan et al. | 370/280 |
| 2013/0336224 A1* | 12/2013 | Davydov et al. | 370/328 |
| 2014/0198675 A1* | 7/2014 | He et al. | 370/252 |

OTHER PUBLICATIONS

International Search Report and Written Opinion—PCT/US2012/069865—ISA/EPO—Apr. 17, 2013.

Qualcomm Inc: "UE-RS Patterns for ranks 5 to 8". 3GPP Draft; R1-100679 UE-RS Patterns for Rank 5-8. 3rd Generation Partnership Project (3GPP). Mobile Competence Centre ; 650. Route Des Lucioles ; F-06921 Sophia-Antipolis Cedex ; France. vol. RAN WG1. No. Valencia. Spain; 20100118. Jan. 12, 2010. XP050418272. [retrieved on Jan. 12, 2010].

Samsung: "Time and frequency synchronization on additional type carriers". A 3GPP Draft; R1-114441 Synchronization on Additional Type Carriers. 3rd Generation Partnership Project (3GPP). Mobile Competence Centre ; 650. Route Des Lucioles ; F-06921 Sophia-Antipolis Cedex ; France. vol. RAN WG1. No. San Francisco. USA; 20111114-20111118. Nov. 21, 2011. XP050562531. [retrieved on Nov. 21, 2011].

Zte: "Discussion on some issues of additional carrier types". 3GPP Draft; R1-113754 Discussion on Some Issues of Additional Carrier Types. 3rd Generation Partnership Project (3GPP). Mobile Competence Centre ; 650. Route Des Lucioles ; F-06921 Sophia-Antipolis Cedex ; France. vol. RAN WG1. No. San Francisco. USA; 20111114-20111118. Nov. 8, 2011. XP050561867. [retrieved on Nov. 8, 2011].

European Office Action dated Mar. 3, 2015, for European Patent Application Serial No. 12812778.4, 8 pages.

Qualcomm Europe, "Enabling MU-MIMO Operation with Dual-Stream Beamforming", 3GPP TSG-RAN WG1 #58, R1-093101, 3RD Generation Partnership Project(3GPP), Mobile Competence Centre; 650, Route Des Lucioles; F-06921 Sophia-Antipolis Cedex; France, vol. RAN WG1, No. Shenzhen, China; 20090824-20090828, Aug. 29, 2009, XP050597714, 4 pages, [retrieved on Aug. 29, 2009].

* cited by examiner

REFERENCE SIGNALS DESIGN FOR TIME TRACKING IN LTE-A

CROSS-REFERENCE TO RELATED APPLICATION(S)

This application claims the benefit of U.S. Provisional Application Ser. No. 61/579,428, entitled "IMPROVED REFERENCE SIGNALS DESIGN FOR TIME TRACKING IN LTE-A" and filed on Dec. 22, 2011, U.S. Provisional Application Ser. No. 61/600,190, entitled "IMPROVED REFERENCE SIGNALS DESIGN FOR TIME TRACKING IN LTE-A" and filed on Feb. 17, 2012, and U.S. Provisional Application Ser. No. 61/625,577, entitled "IMPROVED REFERENCE SIGNALS DESIGN FOR TIME TRACKING IN LTE-A" and filed on Apr. 17, 2012, and which are expressly incorporated by reference herein in their entireties.

BACKGROUND

1. Field

The present disclosure relates generally to communication systems, and more particularly, to methods for and apparatuses with improved reference signals design for time tracking in Long Term Evolution (LTE) Advanced (LTE-A).

2. Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency divisional multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is LTE. LTE is a set of enhancements to the Universal Mobile Telecommunications System (UMTS) mobile standard promulgated by Third Generation Partnership Project (3GPP). It is designed to better support mobile broadband Internet access by improving spectral efficiency, lower costs, improve services, make use of new spectrum, and better integrate with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

SUMMARY

Time tracking in current communication systems may be traditionally based on common reference signals (CRS). However, in certain communication systems, CRS-based time tracking may be impossible or inappropriate to implement. Accordingly, methods for and apparatuses with an improved reference signals design are provided infra. The methods/apparatuses allow a user equipment (UE) to utilize received user equipment specific reference signals (UE-RS) and/or channel state information reference signals (CSI-RS) for improved time tracking.

In an aspect of the disclosure, a method, a computer program product, and an apparatus are provided. The apparatus, which may be an evolved Node B (eNB), restricts a number of resource blocks that can be allocated to a UE in a downlink assignment to be greater than or equal to two. In addition, the apparatus transmits a downlink transmission corresponding to the downlink assignment to the UE.

In an aspect of the disclosure, a method, a computer program product, and an apparatus are provided. The apparatus, which may be a UE, receives a plurality of resource blocks in a transmission. The plurality of resource blocks includes a precoding resource block group (PRG). The apparatus decodes UE-RS based on an assumed same precoding for transmission of the resource blocks in the PRG. The apparatus performs time tracking based on the decoded UE-RS in the PRG.

In an aspect of the disclosure, a method, a computer program product, and an apparatus are provided. The apparatus, which may be a UE, receives at least one resource block in a transmission. Each of the at least one resource block includes a first set of UE-RS. The apparatus determines whether a resource block of the at least one resource block includes a second set of UE-RS. The apparatus performs time tracking based on the first set of UE-RS and based on the second set of UE-RS when the resource block is determined to include the second set of UE-RS.

In an aspect of the disclosure, a method, a computer program product, and an apparatus are provided. The apparatus, which may be an eNB, configures a UE to receive one of a rank one transmission or a rank two transmission. The apparatus transmits a resource block to the UE. The resource block includes a first set of UE-RS and a second set of UE-RS. One of the first set of UE-RS and the second set of UE-RS is for the UE, the other one of the first set of UE-RS and the second set of UE-RS is for another UE or no other UEs.

In an aspect of the disclosure, a method, a computer program product, and an apparatus are provided. The apparatus, which may be a UE, receives a configuration to receive at least one resource block with a first number of CSI-RS ports in each resource block of the at least one resource block. The apparatus receives the at least one resource block in a transmission. The apparatus assumes a resource block of the at least one resource block includes a second number of CSI-RS ports greater than the first number of CSI-RS ports. The apparatus performs time tracking based on signals in resource elements corresponding to the assumed second number of CSI-RS ports.

In an aspect of the disclosure, a method, a computer program product, and an apparatus are provided. The apparatus, which may be an eNB, configures a UE to receive a first number of CSI-RS ports. The apparatus transmits to the UE a resource block including a second number of CSI-RS ports greater than the first number of CSI-RS ports. The second number of CSI-RS ports enables improved time tracking by the UE.

In an aspect of the disclosure, a method, a computer program product, and an apparatus are provided. The apparatus, which may be a UE, receives UE-RS and CSI-RS in at least one resource block. The UE performs time tracking based on the received UE-RS and CSI-RS.

In an aspect of the disclosure, a method, a computer program product, and an apparatus are provided. The apparatus, which may be a UE, receives at least one resource blocks in a transmission, each of the at least one resource blocks comprising a first group of UE-reference signals (UE-RS) associated with a first antenna port. The apparatus determines whether the at least one resource blocks comprise a second group of UE-RS associated with one or more other antenna ports, and processes the received at least one resource blocks based on the first group of UE-RS, and further based on the second group of UE-RS when the at least one resource blocks is determined to comprise the second group of UE-RS.

In an aspect of the disclosure, a method, a computer program product, and an apparatus are provided. The apparatus, which may be a UE, receives at least one resource block in a transmission, where the at least one resource block comprises a first set of reference signals (RS), specific to the UE, determines whether a second set of RS, specific to the UE, is available in the transmission, and processes the received at least one resource block based on the first set of RS and further based on the second set of RS if determined available.

In an aspect of the disclosure, a method, a computer program product, and an apparatus are provided. The apparatus, which may be an eNB, configures a user equipment (UE) to receive a transmission, transmits to the UE at least one resource block in the transmission, where the at least one resource block comprises a first set of reference signals (RS), specific to the UE, and provides a second set of RS in the transmission.

DETAILED DESCRIPTION

Figure 1:
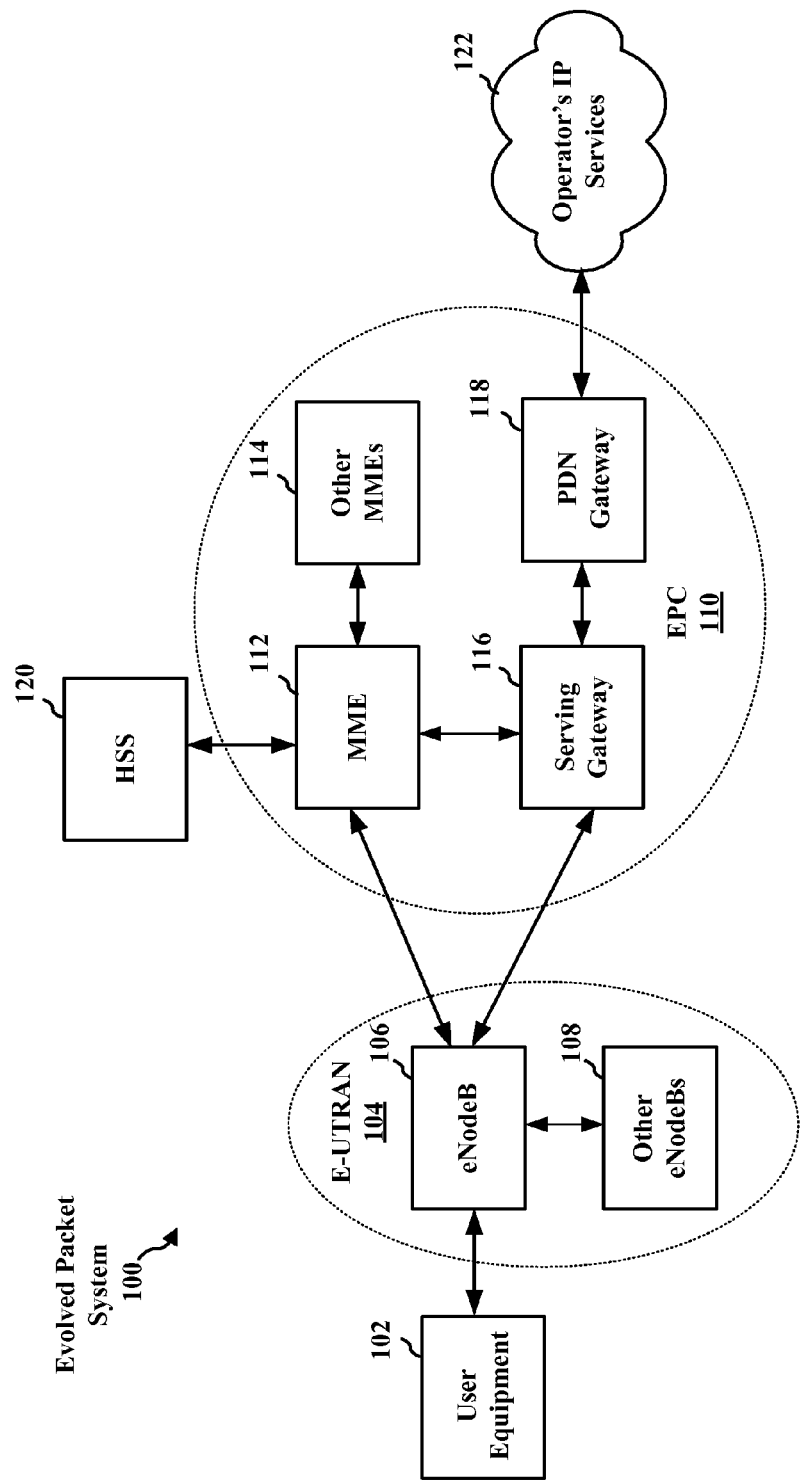
FIG. 1 is a diagram illustrating an example of a network architecture.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, cloud/network storage, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

FIG. 1 is a diagram illustrating an LTE network architecture 100. The LTE network architecture 100 may be referred to as an Evolved Packet System (EPS) 100. The EPS 100 may include one or more user equipment (UE) 102, an Evolved UMTS Terrestrial Radio Access Network (E-UTRAN) 104, an Evolved Packet Core (EPC) 110, a Home Subscriber Server (HSS) 120, and an Operator's IP Services 122. The EPS can interconnect with other access networks, but for simplicity those entities/interfaces are not shown. As shown, the EPS provides packet-switched services, however, as those skilled in the art will readily appreciate, the various concepts presented throughout this disclosure may be extended to networks providing circuit-switched services.

The E-UTRAN includes the evolved Node B (eNB) 106 and other eNBs 108. The eNB 106 provides user and control planes protocol terminations toward the UE 102. The eNB 106 may be connected to the other eNBs 108 via an X2 interface (e.g., backhaul). The eNB 106 may also be referred to as a base station, a base transceiver station, a radio base station, a radio transceiver, a transceiver function, a basic service set (BSS), an extended service set (ESS), or some other suitable terminology. The eNB 106 provides an access point to the EPC 110 for a UE 102. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, or any other similar functioning device. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNB 106 is connected by an S1 interface to the EPC 110. The EPC 110 includes a Mobility Management Entity (MME) 112, other MMEs 114, a Serving Gateway 116, and a Packet Data Network (PDN) Gateway 118. The MME 112 is the control node that processes the signaling between the UE 102 and the EPC 110. Generally, the MME 112 provides bearer and connection management. All user IP packets are transferred through the Serving Gateway 116, which itself is connected to the PDN Gateway 118. The PDN Gateway 118 provides UE IP address allocation as well as other functions. The PDN Gateway 118 is connected to the Operator's IP Services 122. The Operator's IP Services 122 may include the Internet, the Intranet, an IP Multimedia Subsystem (IMS), and a PS Streaming Service (PSS).

Figure 2:
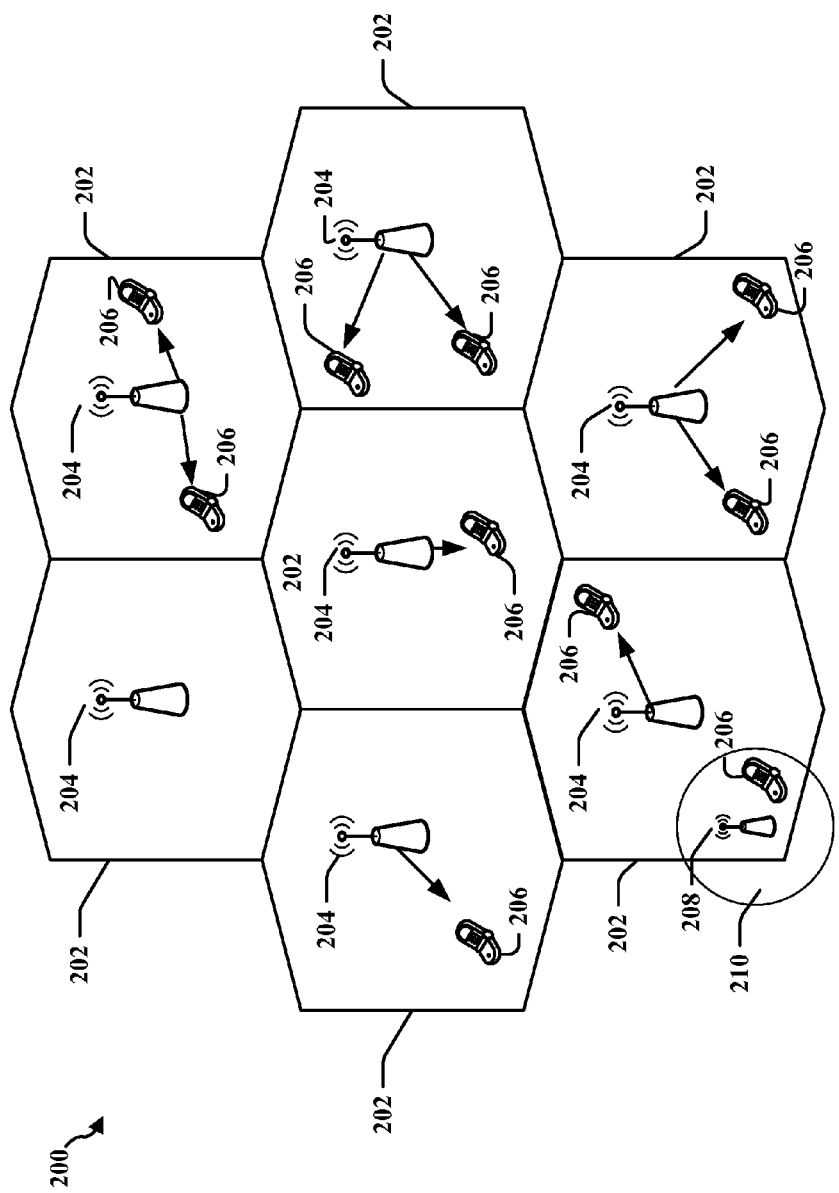
FIG. 2 is a diagram illustrating an example of an access network.

FIG. 2 is a diagram illustrating an example of an access network 200 in an LTE network architecture. In this example, the access network 200 is divided into a number of cellular regions (cells) 202. One or more lower power class eNBs 208 may have cellular regions 210 that overlap with one or more of the cells 202. A lower power class eNB 208 may be referred to as a remote radio head (RRH). The lower power class eNB 208 may be a femto cell (e.g., home eNB (HeNB)), pico cell, or micro cell. The macro eNBs 204 are each assigned to a respective cell 202 and are configured to provide an access point to the EPC 110 for all the UEs 206 in the cells 202. There is no centralized controller in this example of an access network 200, but a centralized controller may be used in alternative configurations. The eNBs 204 are responsible for all radio related functions including radio bearer control, admission control, mobility control, scheduling, security, and connectivity to the serving gateway 116.

The modulation and multiple access scheme employed by the access network 200 may vary depending on the particular telecommunications standard being deployed. In LTE applications, OFDM is used on the DL and SC-FDMA is used on the UL to support both frequency division duplexing (FDD) and time division duplexing (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 204 may have multiple antennas supporting MIMO technology. The use of MIMO technology enables the eNBs 204 to exploit the spatial domain to support spatial multiplexing, beamforming, and transmit diversity. Spatial multiplexing may be used to transmit different streams of data simultaneously on the same frequency. The data steams may be transmitted to a single UE 206 to increase the data rate or to multiple UEs 206 to increase the overall system capacity. This is achieved by spatially precoding each data stream (i.e., applying a scaling of an amplitude and a phase) and then transmitting each spatially precoded stream through multiple transmit antennas on the DL. The spatially precoded data streams arrive at the UE(s) 206 with different spatial signatures, which enables each of the UE(s) 206 to recover the one or more data streams destined for that UE 206. On the UL, each UE 206 transmits a spatially precoded data stream, which enables the eNB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

Figure 3:
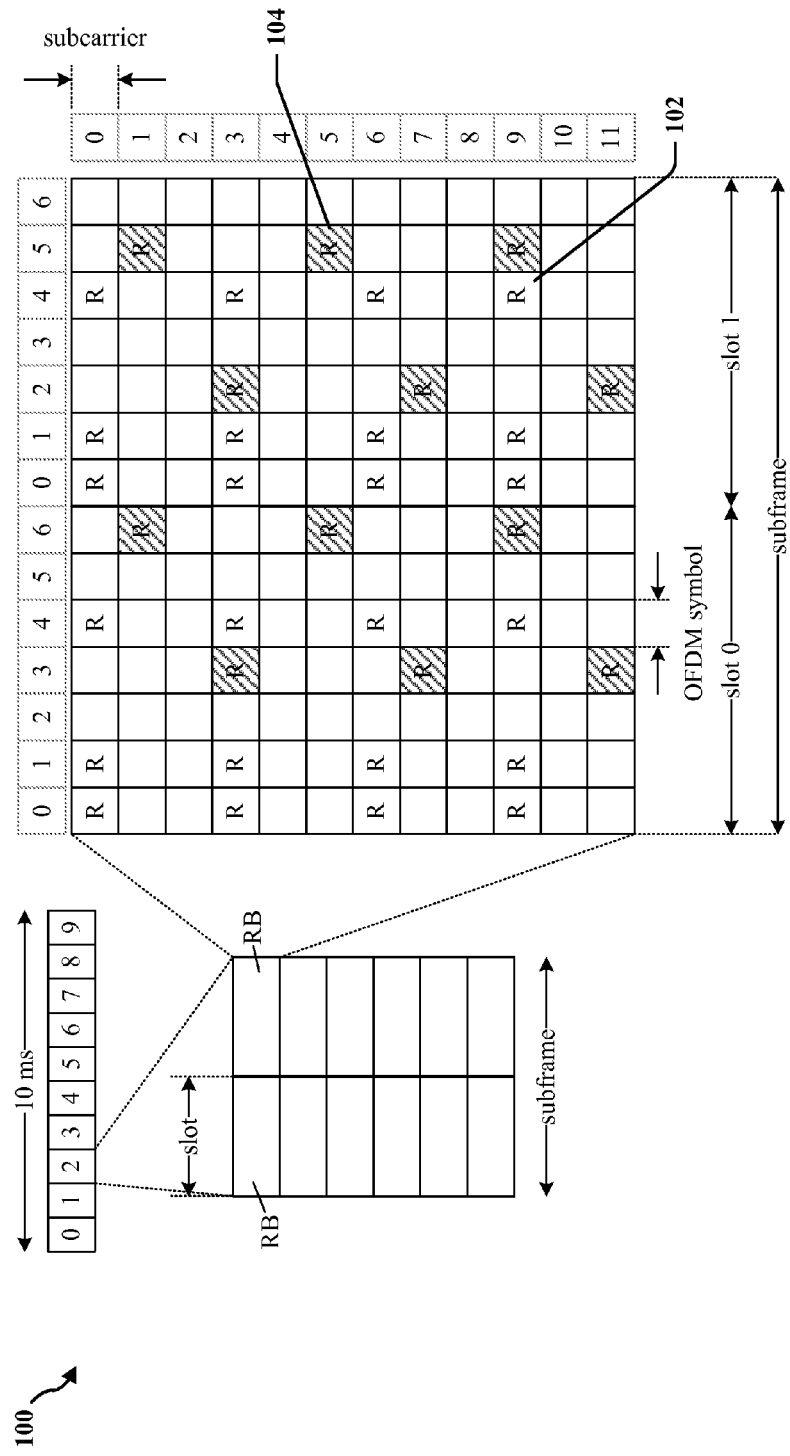
FIG. 3 is a diagram illustrating an example of a DL frame structure in LTE.

FIG. 3 is a diagram 300 illustrating an example of a DL frame structure in LTE. A frame (10 ms) may be divided into 10 equally sized sub-frames. Each sub-frame may include two consecutive time slots. A resource grid may be used to represent two time slots, each time slot including a resource block. The resource grid is divided into multiple resource elements. In LTE, a resource block contains 12 consecutive subcarriers in the frequency domain and, for a normal cyclic prefix in each OFDM symbol, 7 consecutive OFDM symbols in the time domain, or 84 resource elements. For an extended cyclic prefix, a resource block contains 6 consecutive OFDM symbols in the time domain and has 72 resource elements. Some of the resource elements, as indicated as R 302, 304, include DL reference signals (DL-RS). The DL-RS include Cell-specific RS (CRS) (also sometimes called common RS) 302 and UE-specific RS (UE-RS) (also known as demodulation reference signals (DM-RS)) 304. UE-RS 304 are transmitted only on the resource blocks upon which the corresponding physical DL shared channel (PDSCH) is mapped. The number of bits carried by each resource element depends on the modulation scheme. Thus, the more resource blocks that a UE receives and the higher the modulation scheme, the higher the data rate for the UE.

Figure 4:
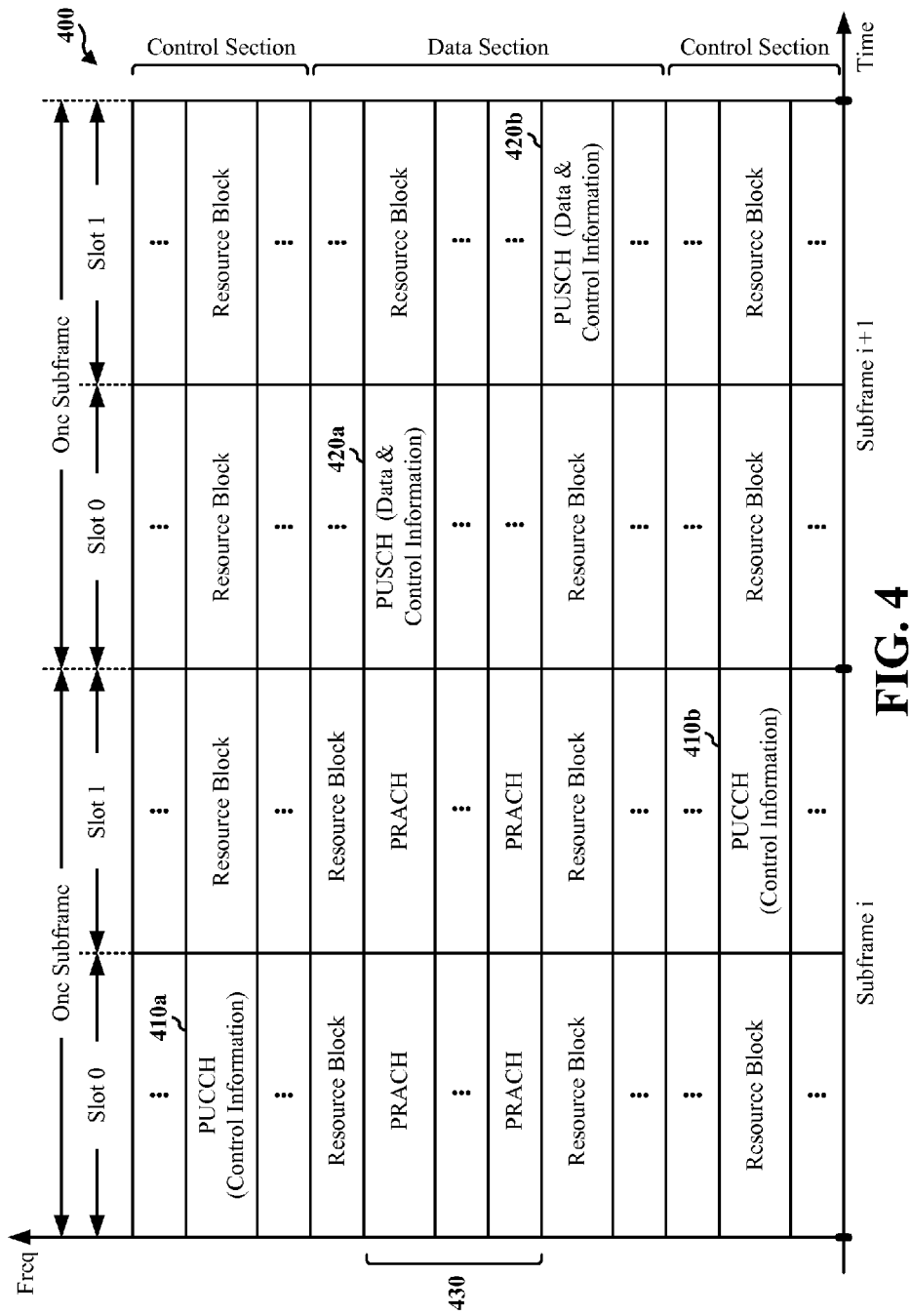
FIG. 4 is a diagram illustrating an example of an UL frame structure in LTE.

FIG. 4 is a diagram 400 illustrating an example of an UL frame structure in LTE. The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks 410a, 410b in the control section to transmit control information to an eNB. The UE may also be assigned resource blocks 420a, 420b in the data section to transmit data to the eNB. The UE may transmit control information in a physical UL control channel (PUCCH) on the assigned resource blocks in the control section. The UE may transmit only data or both data and control information in a physical UL shared channel (PUSCH) on the assigned resource blocks in the data section. A UL transmission may span both slots of a subframe and may hop across frequency.

A set of resource blocks may be used to perform initial system access and achieve UL synchronization in a physical random access channel (PRACH) 430. The PRACH 430 carries a random sequence and cannot carry any UL data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make only a single PRACH attempt per frame (10 ms).

Figure 5:
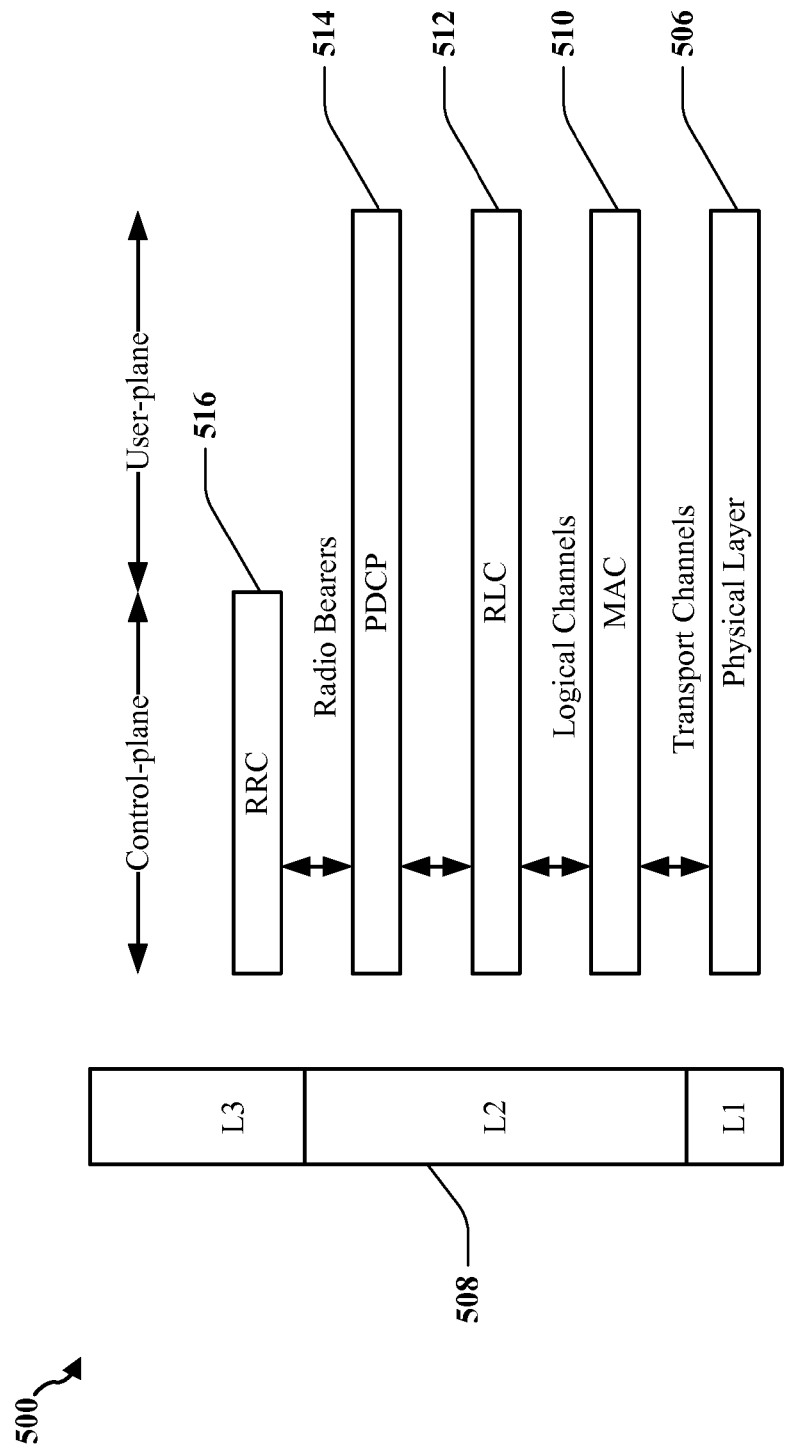
FIG. 5 is a diagram illustrating an example of a radio protocol architecture for the user and control planes.

FIG. 5 is a diagram 500 illustrating an example of a radio protocol architecture for the user and control planes in LTE. The radio protocol architecture for the UE and the eNB is shown with three layers: Layer 1, Layer 2, and Layer 3. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and eNB over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the eNB on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between eNBs. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control plane, the radio protocol architecture for the UE and eNB is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (i.e., radio bearers) and for configuring the lower layers using RRC signaling between the eNB and the UE.

Figure 6:
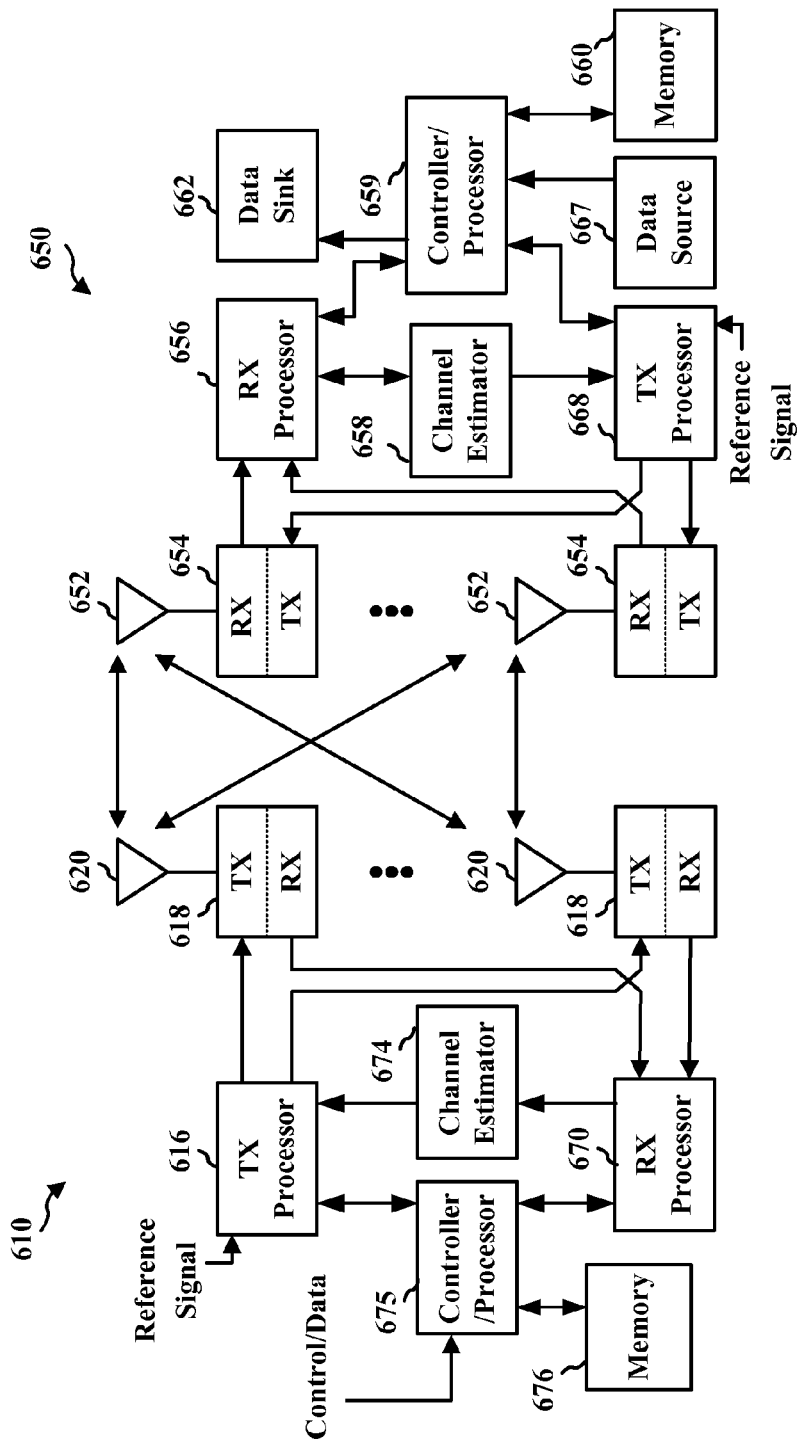
FIG. 6 is a diagram illustrating an example of an evolved Node B and user equipment in an access network.

FIG. 6 is a block diagram of an eNB 610 in communication with a UE 650 in an access network. In the DL, upper layer packets from the core network are provided to a controller/processor 675. The controller/processor 675 implements the functionality of the L2 layer. In the DL, the controller/processor 675 provides header compression, ciphering, packet segmentation and reordering, multiplexing between logical and transport channels, and radio resource allocations to the UE 650 based on various priority metrics. The controller/processor 675 is also responsible for HARQ operations, retransmission of lost packets, and signaling to the UE 650.

The transmit (TX) processor 616 implements various signal processing functions for the L1 layer (i.e., physical layer). The signal processing functions includes coding and interleaving to facilitate forward error correction (FEC) at the UE 650 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream is then provided to a different antenna 620 via a separate transmitter 618TX. Each transmitter 618TX modulates an RF carrier with a respective spatial stream for transmission.

At the UE 650, each receiver 654RX receives a signal through its respective antenna 652. Each receiver 654RX recovers information modulated onto an RF carrier and provides the information to the receive (RX) processor 656. The RX processor 656 implements various signal processing functions of the L1 layer. The RX processor 656 performs spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, is recovered and demodulated by determining the most likely signal constellation points transmitted by the eNB 610. These soft decisions may be based on channel estimates computed by the channel estimator 658. The soft decisions are then decoded and deinterleaved to recover the data and control signals that were originally transmitted by the eNB 610 on the physical channel. The data and control signals are then provided to the controller/processor 659.

The controller/processor 659 implements the L2 layer. The controller/processor can be associated with a memory 660 that stores program codes and data. The memory 660 may be referred to as a computer-readable medium. In the UL, the control/processor 659 provides demultiplexing between transport and logical channels, packet reassembly, deciphering, header decompression, control signal processing to recover upper layer packets from the core network. The upper layer packets are then provided to a data sink 662, which represents all the protocol layers above the L2 layer. Various control signals may also be provided to the data sink 662 for L3 processing. The controller/processor 659 is also responsible for error detection using an acknowledgement (ACK) and/or negative acknowledgement (NACK) protocol to support HARQ operations.

In the UL, a data source 667 is used to provide upper layer packets to the controller/processor 659. The data source 667 represents all protocol layers above the L2 layer. Similar to the functionality described in connection with the DL transmission by the eNB 610, the controller/processor 659 implements the L2 layer for the user plane and the control plane by providing header compression, ciphering, packet segmentation and reordering, and multiplexing between logical and transport channels based on radio resource allocations by the eNB 610. The controller/processor 659 is also responsible for HARQ operations, retransmission of lost packets, and signaling to the eNB 610.

Channel estimates derived by a channel estimator 658 from a reference signal or feedback transmitted by the eNB 610 may be used by the TX processor 668 to select the appropriate coding and modulation schemes, and to facilitate spatial processing. The spatial streams generated by the TX processor 668 are provided to different antenna 652 via separate transmitters 654TX. Each transmitter 654TX modulates an RF carrier with a respective spatial stream for transmission.

The UL transmission is processed at the eNB 610 in a manner similar to that described in connection with the receiver function at the UE 650. Each receiver 618RX receives a signal through its respective antenna 620. Each receiver 618RX recovers information modulated onto an RF carrier and provides the information to a RX processor 670. The RX processor 670 may implement the L1 layer.

The controller/processor 675 implements the L2 layer. The controller/processor 675 can be associated with a memory 676 that stores program codes and data. The memory 676 may be referred to as a computer-readable medium. In the UL, the control/processor 675 provides demultiplexing between transport and logical channels, packet reassembly, deciphering, header decompression, control signal processing to recover upper layer packets from the UE 650. Upper layer packets from the controller/processor 675 may be provided to the core network. The controller/processor 675 is also responsible for error detection using an ACK and/or NACK protocol to support HARQ operations.

With respect to unicast and multicast/broadcast services, a UE may perform time tracking (also referred to as timing tracking) for updating a downlink timing for receiving signals associated with those services. Time tracking is an important factor in receiver performance as it allows for a correct starting point of a FFT window such that inter-symbol interference is minimized. A timing offset determined by time tracking can be further used for channel estimation in a current subframe and is used to update the downlink timing (i.e., starting point of the FFT window) for a next subframe.

Traditionally, time tracking in current communication systems (e.g., LTE Rel-8/9/10) may be based on common reference signals (CRS). CRS is wide-band and may be present in all subframes. Reliable time tracking is thus possible and the time tracking may utilize (e.g., average) two or more subframes for improved performance. In other communication systems (e.g., LTE Rel-11 and beyond), CRS time tracking may either be impossible or inappropriate. In some subframes or carriers, CRS may not be present. For example, a communication system (e.g., LTE Rel-11) may define additional carrier types that are backward compatible. Accordingly, CRS may not always be present in these carriers in all subframes. In the additional carrier types, CRS may be present in only some subframes. Furthermore, in some scenarios (e.g., coordinated multipoint (CoMP) Tx/Rx), use of CRS may be inappropriate for time tracking. In CoMP, control and data may arrive from different cells. Thus, a UE may assume a wrong cell for CRS-based time tracking.

Non-CRS-based time tracking may be needed in certain communication systems (e.g., LTE Rel-11 and beyond). As such, time tracking may be performed based on UE-RS, CSI-RS, and/or other reference signals. However, unlike CRS-based time tracking, UEs cannot always rely on UE-RS and/or CSI-RS for time tracking, as UE-RS/CSI-RS bandwidth/density may be limited. For example, UE-RS may be present for a UE only when the UE is scheduled. That is, UE-RS is available for a UE only in a scheduled PDSCH bandwidth, which may range from one resource block (RB) (also referred to as a physical RB (PRB)) to $N_{RB}^{DL}$ RBs, where $N_{RB}^{DL}$ is a downlink system bandwidth in units of RBs. Accordingly, a UE-RS antenna port may not map to the same physical antenna port(s) over different subframes. Furthermore, CSI-RS may only be present in a subset of subframes and may have a low density, as only one resource element (RE) per RB per CSI-RS port exists. As a result, time tracking cannot readily rely on multiple subframes for averaging to improve receiver performance. In addition, UE-RS-based time tracking performance can be heavily compromised if an assigned PDSCH bandwidth is very small (e.g., one or a few RBs). Further, CSI-RS time tracking performance can be compromised as well due to low density.

In a communication system (e.g., LTE Rel-11), an enhanced PDCCH (ePDCCH) may be provided. Unlike a legacy PDCCH, which occupies the first several control symbols in a subframe, ePDCCH occupies a data region, similar to PDSCH. Unlike PDSCH, whose bandwidth is often large, one ePDCCH may only consume one RB or a very limited number of RBs. UE-RS-based ePDCCH may be supported in the communication system. A UE configured to use ePDCCH/PDCCH may not reliably receive CRS (e.g., due to overwhelming interference from neighboring cells in heterogeneous networks) or CRS may not be available (e.g., CRS is not present). Time tracking would thus not only impact PDSCH performance, but also impact PDCCH/ePDCCH performance, especially when the corresponding bandwidth is limited. Accordingly, methods are needed to improve the time tracking performance for UE-RS and/or CSI-RS based time tracking, especially when the assigned bandwidth and/or the RS density is low (in frequency and/or time).

Figure 7:
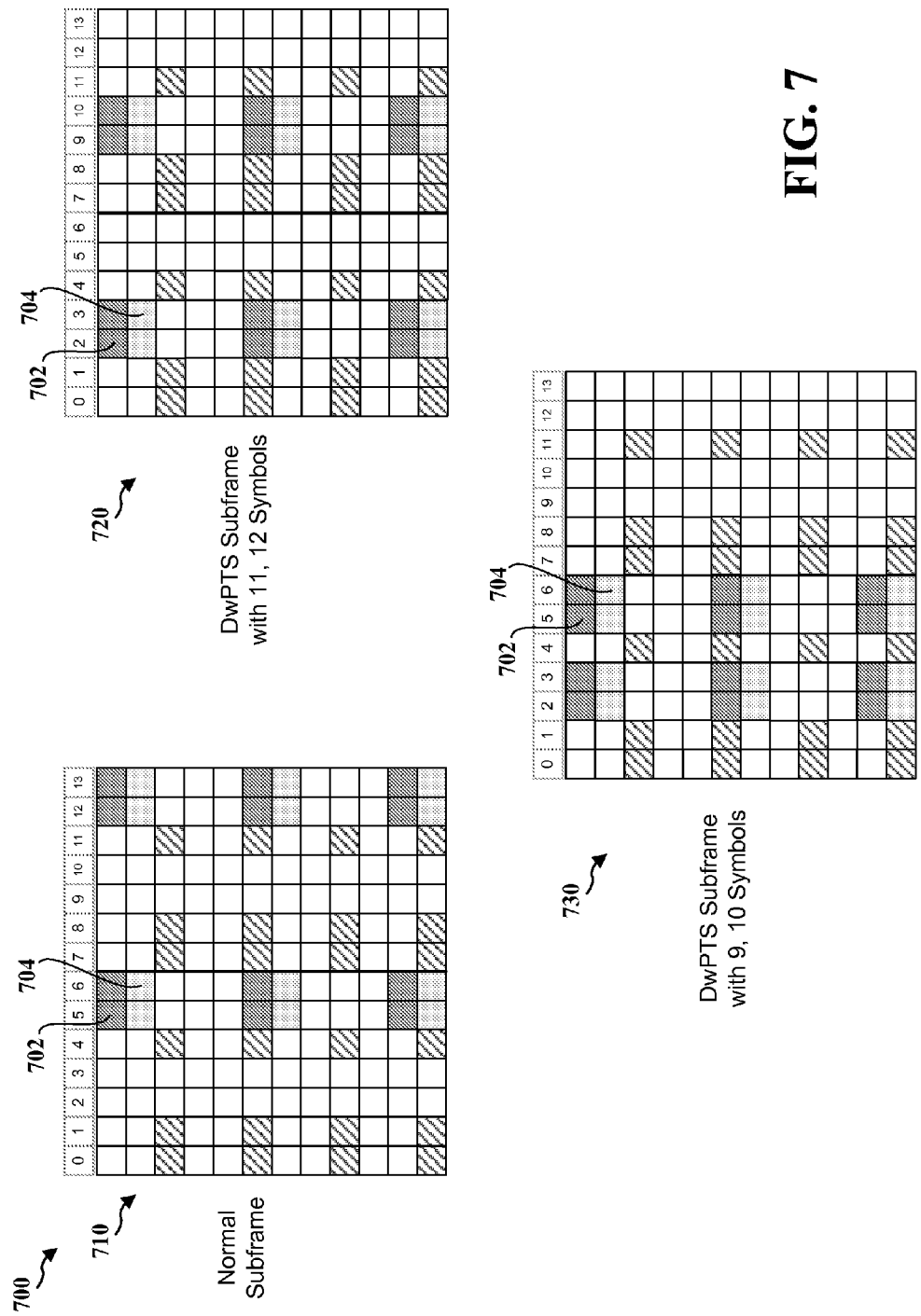
FIG. 7 is a diagram illustrating the location of UE-RS within various types of subframes and for describing exemplary methods for UE-RS-based time tracking.

FIG. 7 is a diagram 700 illustrating the location of UE-RS within various types of subframes and for describing exemplary methods for UE-RS-based time tracking. In FIG. 7, diagram 710 illustrates the location of UE-RS within a normal subframe. Diagram 720 illustrates the location of UE-RS within a downlink pilot time slot (DwPTS) subframe with 11, 12 symbols. Diagram 730 illustrates the location of UE-RS within a DwPTS subframe with 9, 10 symbols. A UE may be able to utilize up to 24 REs per RB for UE-RS. For rank 1 and rank 2 transmissions, only UE-RS REs 702 (darker shaded REs in FIG. 7) are present, resulting in 12 REs per RB for UE-RS. For transmissions greater than rank 2, both the UE-RS REs 702 and UE-RS REs 704 (lighter shaded REs in FIG. 7) are present, resulting in 24 REs per RB for UE-RS. For a limited number of RBs (PDSCH and/or ePDCCH), time tracking performance may be heavily compromised, especially when only 12 UE-RS REs/RB are available (i.e., when a UE is configured to receive rank 1 or rank 2 transmissions).

To address the UE-RS-based time tracking issue, in a first exemplary method, an eNB may explicitly restrict small PDSCH/PDCCH assignments. For example, an eNB may not allow 1 RB PDSCH assignments. Alternatively, an eNB may restrict small PDSCH/PDCCH assignments based on modulation order. For example, an eNB may allow a 1 RB+QPSK combination, but not combinations of 1 RB with 16/64-QAM. For a higher modulation order, higher accuracy time tracking may be required. Therefore, the eNB may restrict small PDSCH/PDCCH assignments only for higher modulation orders.

According to the first exemplary method, an eNB may restrict a number of RBs that can be allocated to a target UE in a downlink assignment to be greater than or equal to two (three, four, etc.), generally or based on the modulation order. The term "target UE" may refer to a UE within the eNB's cell that is the focus of the resource allocation. For example, the eNB may restrict the number of RBs that can be allocated to the target UE in the downlink assignment to be two or three. Accordingly, the eNB may transmit a downlink transmission (data/control) corresponding to the downlink assignment to the target UE. Moreover, the eNB may determine a modulation order (e.g., QPSK, 16-QAM, 64-QAM) for the downlink transmission and determine whether to restrict the number of RBs based on the determined modulation order. For example, the eNB may restrict the number of RBs that can be allocated to the target UE in the downlink assignment to be greater than or equal to two only when the modulation order is greater than a threshold (e.g., the threshold may be QPSK).

In a second exemplary method, a target UE may utilize a precoding resource block group (PRG) feature for UE-RS-based time tracking In a communication system (e.g., LTE Rel-10), PRGs may be supported for a target UE configured with transmission mode 9 and precoding matrix indicator (PMI)/rank indicator (RI) channel feedback. In the second exemplary method, the target UE may assume that a precoding granularity is two or more RBs in the frequency domain (instead of one RB as in a typical case). Accordingly, the target UE may assume that the same precoder applies on all scheduled RBs within a PRG. Each PRG includes consecutive RBs with the same precoding. A PRG size is downlink system bandwidth dependent as shown in the following table:

| System Bandwidth (RBs) | PRG Size (RBs) |
| --- | --- |
| ≤10 | 1 |
| 11-26 | 2 |
| 27-63 | 3 |
| 64-110 | 2 |

When the target UE receives a plurality of RBs containing UE-RS in a PRG, the target UE may decode the UE-RS in the plurality of resource blocks based on an assumed same precoding for the transmission of the RBs in the PRG. The target UE may then be able to perform time tracking based on a coherent combining of the decoded UE-RS. Alternatively, if the target UE decodes UE-RS in the plurality of RBs based on a different precoding, the target UE would have to independently perform time tracking for each precoding subgroup, and combine the results afterward (e.g., via averaging), which has poorer performance than coherent combining. As such, in coherent combining, the time tracking algorithm is performed once with all the decoded UE-RS, whereas without coherent combining, time tracking is performed multiple times and combined through averaging. Accordingly, in the second exemplary method, the target UE may exploit the same precoding within the PRG for improved performance of UE-RS-based time tracking.

In a third exemplary method, an RB may be assumed to include 24 UE-RS REs (12 UE-RS REs 702 (darker shaded REs in FIG. 7) and 12 UE-RS REs 704 (lighter shaded REs in FIG. 7)) for improved time tracking. The additional second set of 12 UE-RS (e.g., the 12 UE-RS REs 704) helps improve time tracking (and PDSCH/ePDCCH decoding). The additional second set of 12 UE-RS may be associated with assignments of only a small number of RBs. For example, when a downlink assignment includes one RB PDSCH and/or PDCCH, the RB may be assumed to include 24 UE-RS REs. Otherwise, when a downlink assignment includes more than one RB PDSCH and/or PDCCH, the RB may be assumed to include 12 UE-RS REs or 24 UE-RS REs depending on the configuration or assignments. For example, rank 1 or rank 2 transmissions may include 12 UE-RS REs and transmissions greater than rank 2 transmissions may include 24 UE-RS REs. A target UE may perform blind detection to determine the existence of the additional 12 UE-RS REs without signaling from the eNB.

The second set of 12 UE-RS REs may not be meant for other UEs. Therefore, the eNB may use the same precoding to transmit the second set of 12 UE-RS REs as used to transmit the first set of 12 UE-RS REs. Alternatively, the second set of 12 UE-RS REs may be meant for other UEs, and therefore may have a different precoding. For example, the second set of UE-RS REs may be used for multiuser MIMO (MU-MIMO) operation for PDSCH or for MU-MIMO operation for ePDCCH. In another example, two or more ePDCCHs may share the same RB in a frequency division multiplexing (FDM) manner and use different antenna ports.

Accordingly, depending on whether the second set of UE-RS REs is meant for other UEs or not, the second set UE-RS REs may be transmitted with a different precoding as the precoder used for the first set UE-RS REs. For example, if an eNB transmits the second set of UE-RS REs with a different precoding, the second set of UE-RS REs is used by at least one other UE. In another example, if an eNB transmits the second set of UE-RS REs with the same precoding as the first set of UE-RS REs (in order to achieve power randomization), the second set of UE-RS REs may be used by at least one other UE or by no other UEs. When the second set of UE-RS REs are used by no other UEs, and the target UE is not configured to receive the second set of UE-RS REs (e.g., in rank 1 or 2 transmissions), the eNB specifically transmits the second set of UE-RS REs to the target UE to enable improved time tracking performance.

Both the first and second sets of UE-RS REs having the same precoding is similar to a PRG model, the difference being that the same precoding is used across the two sets of UE-RS REs within an RB instead of across RBs as in the PRG case. If both antenna port 7 and antenna port 8 are present in the first set of UE-RS REs, the duplication of precoding can be applied to one of antenna port 7 or antenna port 8 or both of antenna ports 7 and 8 depending on whether one of antenna port 7 or antenna port 8 or both of antenna ports 7 and 8 are relied on for UE-RS-based time tracking. For PDSCH, because MU-MIMO is only supported with antenna port 7 and antenna port 8 (which are mapped to the first set of 12 UE-RS REs), an eNB may use the same precoding for the first and second sets of UE-RS REs when the target UE is configured to receive the downlink transmission with antenna port 7 and/or antenna port 8. That is, when the target UE is configured to receive the downlink transmission with antenna port 7 and/or antenna port 8, the second set of UE-RS REs are not utilized by other UEs. Therefore, the eNB may transmit the second set of UE-RS REs to a particular UE with the same precoding even though the particular UE is configured to receive only the first set of UE-RS REs (e.g., when configured to receive rank 1 or 2 transmissions) to enable better time tracking for the particular UE.

For e-PDCCH, within one RB, antenna port 7 and/or antenna port 8 may be present. Alternatively, within one RB, at least one of antenna ports 7, 8, 9, or 10 may be present. If only antenna ports 7 and/or 8 are present for ePDCCH within one RB, the eNB may use the same precoding for both the first and second sets of UE-RS REs, as there is no MU-MIMO for the second set of UE-RS REs. If antenna ports 7 and/or 8 and antenna ports 9 and/or 10 are present for ePDCCH within one RB, the second set of UE-RS REs may be used by other UEs. Accordingly, the eNB may inform a target UE whether the second set of UE-RS REs is meant for other UEs. If the target UE receives such information, the target UE will know that the second set of UE-RS REs have a different precoding than the first set of UE-RS REs. Otherwise, if the target UE does not receive such information, the target UE will assume the second set of UE-RS REs have the same precoding as the first set of UE-RS REs. The eNB may inform the target UE whether the second set of UE-RS REs is used for other UEs via either one-bit signaling or through hard-coded information (e.g., no MU-MIMO for one RB operation).

Additionally, if a UE receives two or more ePDCCH transmissions in the same PRB pair or PRB pairs of the same PRG, the UE may assume that the same precoding is applied to different antenna ports associated with the two or more ePDCCH transmissions. The two or more ePDCCH transmissions may be localized transmissions, such that the resources occupied by ePDCCH are within the given PRB pair or PRB pairs of the same PRG. The two or more ePDCCH transmissions for the same UE may be a broadcast ePDCCH (e.g., system information broadcast), a group cast ePDCCH (e.g., group power control), a unicast ePDCCH scheduling downlink channels, a unicast ePDCCH scheduling uplink channels, or a combination thereof.

The two or more ePDCCH transmissions may be associated with antenna ports 7, 8, 9, and/or 10. For example, the UE may receive an ePDCCH for downlink scheduling associated with antenna port 7 and an ePDCCH for uplink scheduling with antenna port 8. The UE may assume that the same precoding is applied for antenna port 7 and antenna port 8 for the two ePDCCH transmissions. The UE may further assume that the same precoding is also applied for antenna port 9 and 10, if the second set of UE-RS REs are available for ePDCCH decoding for the UE.

In another example, the UE may receive an ePDCCH for downlink scheduling associated with antenna port 7 and an ePDCCH for uplink scheduling with antenna port 9. The UE may assume that the same precoding is applied for antenna port 7 and antenna port 9 for the two ePDCCH transmissions. In order to determine whether or not two or more ePDCCH transmissions in the same PRB pair or PRB pairs of the same PRG are transmitted to the UE, the UE may perform ePDCCH decoding in a parallel or a serial manner. In parallel decoding, the UE may assume that two or more ePDCCH transmissions are present such that the same precoding is applied to two or more antenna ports and perform decoding for the two or more ePDCCH transmissions simultaneously. In serial decoding, the UE may perform ePDCCH decoding with one antenna port first, and after at least one successful ePDCCH decoding, the UE may further perform additional ePDCCH decoding within the same PRB pair or PRB pairs of the same PRG assuming the same precoding of the corresponding antenna ports. In order to facilitate the ePDCCH decoding, the eNB may ensure that the two or more ePDCCH transmissions for the same UE are located in the same PRB pair or PRB pairs of the same PRG.

The possible combinations of antenna ports associated with the two or more ePDCCH transmissions for the same UE can be restricted. For example, a UE may assume that only one combination of antenna ports, e.g., {7, 9}, can be used for two ePDCCH transmissions for the same UE in the same PRB pair or PRB pairs of the same PRG.

In one configuration, if four ports in an RB are necessary, an eNB may be configured to use antenna ports 7, 8, 11, and 13 (which are mapped to the first set of 12 UE-RS REs), and therefore a target UE may assume the same precoding for both the first and second sets of UE-RS REs. Alternatively, an eNB may be configured to use antenna ports 9, 10, 12, and 14 (which are mapped to the second set of 12 UE-RS REs), and therefore a target UE may assume the same precoding for both the first and second sets of UE-RS REs.

The three design alternatives are not necessarily exclusive to each other. That is, additional exemplary methods may combine at least two of the first, second, and third exemplary methods. For example, a combination of the second exemplary method and the third exemplary method for a rank 1 or rank 2 transmission of PDSCH with 2 RBs in the same PRG may be used, where 24 UE-RS REs are present in each of the 2 RBs, and each set of 12 REs has the same precoder.

Figure 8:
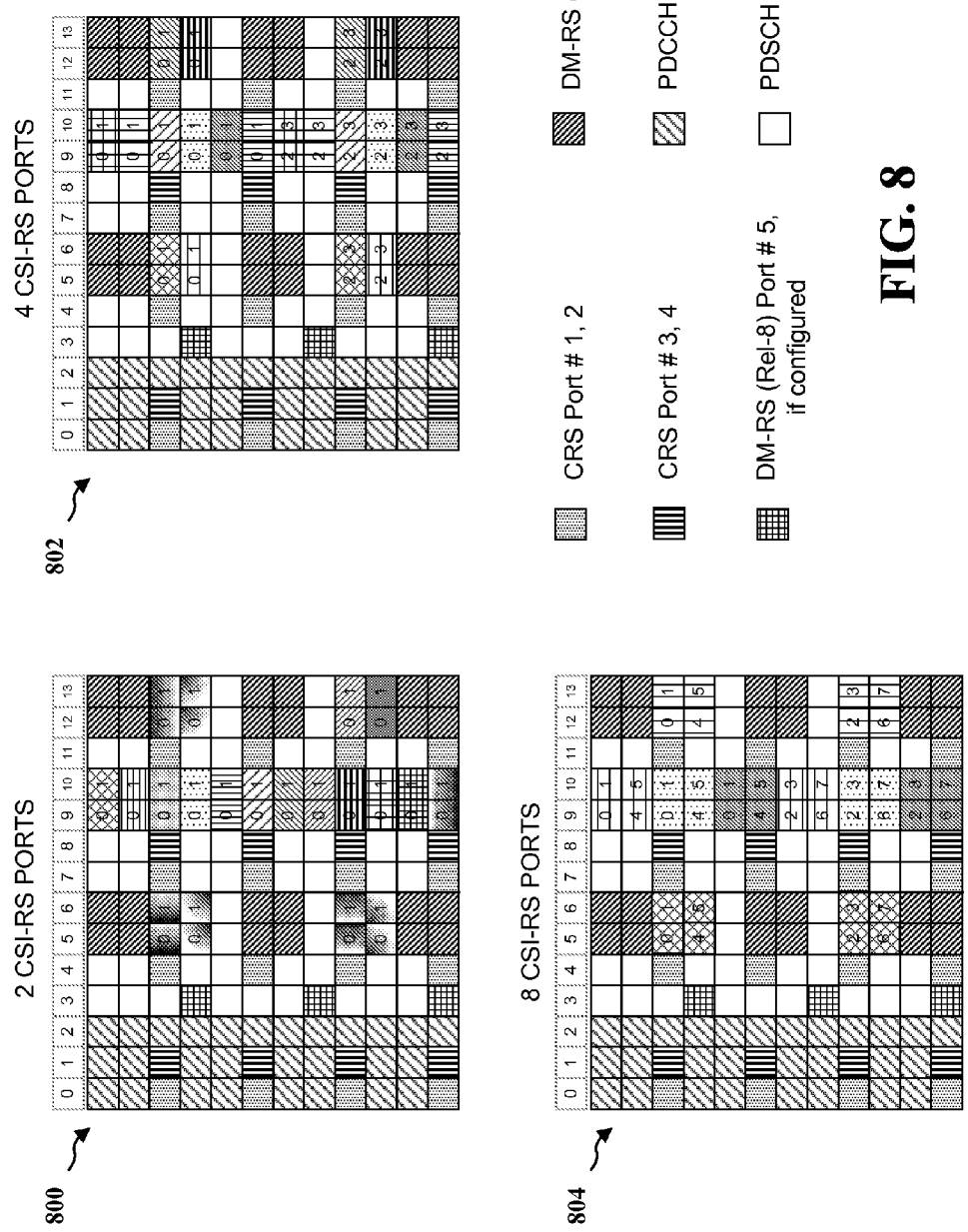
FIG. 8 illustrates diagrams of reference signal configurations within a set of resource blocks and for describing exemplary methods for CSI-RS-based time tracking.

FIG. 8 illustrates diagrams 800, 802, and 804 of reference signal configurations within a set of resource blocks and for describing exemplary methods for CSI-RS-based time tracking. The set of resource blocks may include common or cell-specific reference signals (CRS) for ports 1, 2, 3, and 4, demodulation reference signals (DM-RS), and channel state information reference signals (CSI-RS). Diagram 800 shows a configuration for two CSI-RS, diagram 802 shows a configuration for four CSI-RS, and diagram 804 shows a configuration for eight CSI-RS. A physical downlink control channel (PDCCH) and the PDSCH are also shown. For CSI-RS, there is one RE per CSI-RS port, and up to eight CSI-RS ports per set of CSI-RS resources. Currently, CSI-RS has a smallest periodicity of 5 ms (present once every 5 ms at most). In a communication system (e.g., LTE Rel-11), a target UE may be configured with two or more sets of CSI-RS resources. For example, if the target UE is configured with two sets of CSI-RS resources and each set includes eight CSI-RS ports, then the target UE may be configured with 16 CSI-RS ports.

In a fourth exemplary method, a target UE may assume that it is configured with eight CSI-RS ports, even if there is a smaller number of required CSI-RS ports (e.g., 4). If CSI-RS is precoded, the same precoding can be applied to the additionally assumed CSI-RS ports. Additionally, an eNB can broadcast the proximity of the two or more CSI-RS resource sets. Typically, the two or more configured sets of CSI-RS resources for a target UE may belong to different cells (e.g., in CoMP), which can be physically non-collocated. However, if the two or more cells have roughly the same distance to the target UE, such that the cells have approximately the same downlink timing at target UE reception (including propagation delay, repeater delay, etc.), the target UE can safely combine the two or more CSI-RS sets for improved time tracking. Otherwise, the target UE may not combine the two or more CSI-RS sets for time tracking, as they may have different downlink timings at the target UE reception. By informing the target UE of the proximity of the two or more CSI-RS sets, the target UE can take appropriate action for time tracking.

The assumed additional CSI-RS may be narrowband. Therefore, a target UE may assume that the additional CSI-RS exist in only a subset of the subframes that carry CSI-RS. As such, there may be one set of wideband CSI-RS for CSI feedback and a different set of narrowband CSI-RS (which is only localized to the assigned PDSCH bandwidth) for time tracking. For backward compatibility with legacy UEs, the eNB may need to broadcast the second set of CSI-RS as muted REs for the legacy UEs. The exemplary methods may also be applied to channel estimation for PDSCH/ePDCCH or other functions. Combinations of UE-RS and CSI-RS based on approaches are also possible.

Figure 9:
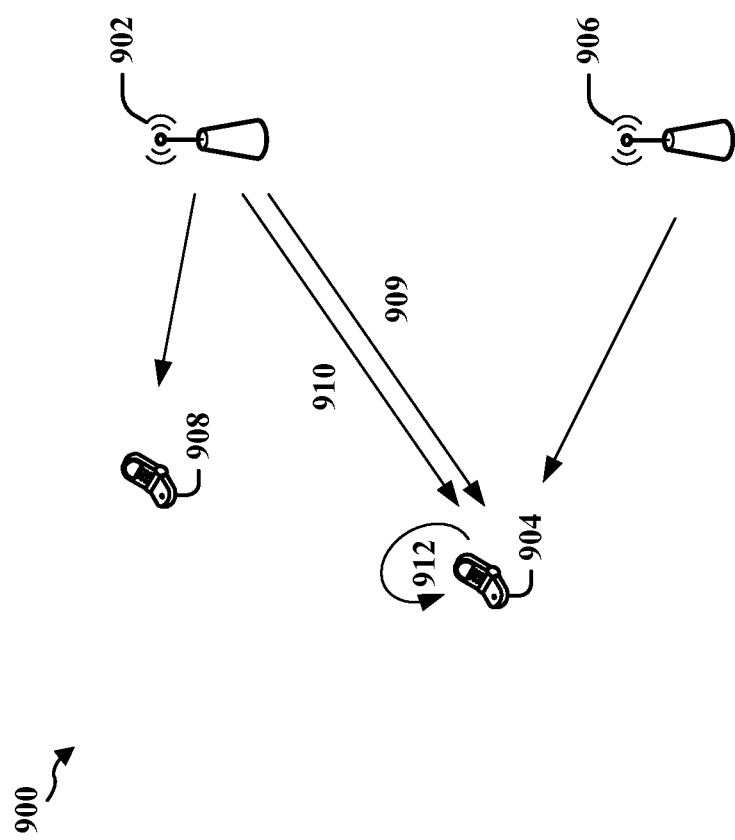
FIG. 9 is a diagram for illustrating the exemplary methods.

FIG. 9 is a diagram 900 for illustrating the exemplary methods. In a first configuration, an eNB 902 restricts a number of RBs that can be allocated to a UE 904 in a downlink assignment 909 to be greater than or equal to N, where N>1 (e.g., N=2). The eNB 902 transmits the downlink transmission 910 corresponding to the downlink assignment 909 to the UE 904. The eNB 902 may determine a modulation order for the downlink transmission 910 and determine whether to restrict the number of RBs that can be allocated to the UE 904 based on the determined modulation order. The eNB 902 may restrict the number of RBs based on the determined modulation order by restricting the number of RBs that can be allocated to the UE 904 in the downlink assignment 909 to be greater than or equal to two only when the modulation order is greater than a threshold (e.g., 1 RB+QPSK is allowed, but 1 RB+16-QAM is not allowed). Based on the UE-RS and/or CSI-RS in the plurality of RBs within the downlink transmission 910, the UE 904 performs time tracking 912.

In a second configuration, the UE 904 receives a plurality of RBs in a transmission 910 from the eNB 902. The plurality of RBs includes a PRG. The UE 904 decodes UE-RS based on an assumed same precoding for transmission of the RBs in the PRG. The UE 904 performs time tracking 912 based on the decoded UE-RS in the PRG. The UE 904 may receive a configuration from the eNB 902 to receive the transmission 910 using a transmission mode supporting CoMP transmission (e.g., transmission mode 9).

In a third configuration, the UE 904 receives at least one RB in a transmission 910. Each of the at least one RB includes a first set of UE-RS (e.g., the UE-RS 702 including 12 UE-RS REs). The UE 904 determines whether an RB of the at least one RB includes a second set of UE-RS (e.g., the UE-RS 704 including 12 UE-RS REs). The UE 904 performs time tracking 912 based on the first set of UE-RS and based on the second set of UE-RS when the RB is determined to include the second set of UE-RS. The UE 904 may determine whether the RB of the at least one RB includes the second set of UE-RS only when the at least one RB includes only the RB. That is, the UE 904 may determine (e.g., through blind detection or explicit signaling) whether the second set of UE-RS is included in the downlink transmission only when less than a threshold number (e.g., 2 RBs) of RBs are received. The transmission 910 may be a rank one transmission or a rank two transmission. The first set of UE-RS may be meant for the UE 904, and the second set of UE-RS may be meant for another UE (e.g., the UE 908) or no other UEs. The first set of UE-RS and the second set of UE-RS may have a different precoding and, therefore, the second set of UE-RS may be meant for another UE, such as the UE 908. Of course, the eNB may transmit the second set of UE-RS with a different precoding than used for the first set of UE-RS even though the second set of UE-RS is for no other UEs. The first set of UE-RS and the second set of UE-RS may have the same precoding. The UE 904 may determine whether an RB of the at least one RB includes the second set of UE-RS by performing blind detection. The UE 904 may determine whether an RB of the at least one RB includes the second set of UE-RS by receiving from the eNB 902 information indicating whether the RB includes the second set of UE-RS.

In a fourth configuration, the eNB 902 configures the UE 904 to receive one of a rank 1 transmission or a rank 2 transmission. The eNB 902 transmits an RB to the UE 904. The RB includes a first set of UE-RS and a second set of UE-RS. One of the first set of UE-RS and the second set of UE-RS is meant for the UE 904. The other one of the first set of UE-RS and the second set of UE-RS is meant for another UE (e.g., the UE 908) or no other UEs. The first set of UE-RS may include 12 UE-RS and the second set of UE-RS may include 12 UE-RS for a total of 24 UE-RS. The eNB 902 may transmit the RB with a set of RBs, and the eNB 902 may transmit the second set of UE-RS with at least one UE-RS when a number of RBs in the set of RBs is less than a threshold number (e.g., 2). The eNB 902 may use the same precoding for the first set of UE-RS and the second set of UE-RS. The eNB 902 may use a different precoding for the first set of UE-RS and the second set of UE-RS, and therefore the other one of the first set of UE-RS and the second set of UE-RS is for another UE, such as the UE 908. The eNB 902 may determine to transmit the RB with four antenna ports, and to select the four antenna ports to include antenna ports 7, 8, 11, and 13. The antenna ports 7, 8, 11, and 13 may provide a mapping of UE-RS to the first set of UE-RS. The first set of UE-RS may be for the UE 904 and the second set of UE-RS may be for no other UEs, and the eNB 902 may include the second set of UE-RS in the RB to enable the UE 904 to perform time tracking based on both the first set of UE-RS and the second set of UE-RS. The eNB 902 may determine to transmit the RB with four antenna ports, and to select the four antenna ports to include antenna ports 9, 10, 12, and 14. The antenna ports 9, 10, 12, and 14 may provide a mapping of UE-RS to the second set of UE-RS. The second set of UE-RS may be for the UE 904 and the first set of UE-RS may be for no other UEs, and the eNB 902 may include the first set of UE-RS in the RB to enable the UE 904 to perform time tracking based on both the first set of UE-RS and the second set of UE-RS.

In a fifth configuration, the UE 904 receives a configuration to receive at least one RB with a first number of CSI-RS ports (e.g., four CSI-RS ports) in each RB of the at least one RB. The UE 904 receives the at least one RB in a transmission 910. The UE 904 assumes that an RB of the at least one RB includes a second number of CSI-RS ports (e.g., 8 CSI-RS ports) greater than the first number of CSI-RS ports. The UE 904 performs time tracking 912 based on signals in REs corresponding to the assumed second number of CSI-RS ports. The UE 904 may assume that the RB includes the second number of CSI-RS ports when the at least one RB includes less than a threshold number (e.g., 8) of RBs and the first number of CSI-RS ports is less than a threshold number of CSI-RS ports. The second number of CSI-RS ports may include at least a first set of CSI-RS ports transmitted by the eNB 902 and a second set of CSI-RS ports transmitted by a second eNB 906. The UE 904 may receive proximity information from the eNB 902 indicating one of a distance from each of the eNB 902 and the eNB 906, a propagation time from each of the eNB 902 and the eNB 906, a relationship between the distance from the eNB 902 and the eNB 906, or a relationship between the propagation time from the eNB 902 and the eNB 906. The UE 904 may perform time tracking 912 based on the received proximity information.

In a sixth configuration, the eNB 902 configures the UE 904 to receive a first number of CSI-RS ports. The eNB 902 transmits to the UE 904 an RB including a second number of CSI-RS ports greater than the first number of CSI-RS ports. The second number of CSI-RS ports enables improved time tracking by the UE 904. The first number of CSI-RS ports may correspond to a first set of CSI-RS ports, additional CSI-RS ports in the second number of CSI-RS ports may correspond to a second set of CSI-RS ports, and the same precoding may be applied to the first set of CSI-RS ports and the second set of CSI-RS ports in the transmitted RB. The eNB 902 may transmit proximity information to the UE 904. The proximity information may include one of a distance between the UE 904 and the eNB 902 and a distance between the UE 904 and a second eNB 906, a propagation time from the eNB 902 to the UE 904 and from the second eNB 906 to the UE 904, a relationship between the distance from the eNB 902 and the second eNB 906, or a relationship between the propagation time from the eNB 902 and the second eNB 906. The first number of CSI-RS ports may correspond to a first configuration, additional CSI-RS ports in the second number of CSI-RS ports as compared to the first number of CSI-RS ports may correspond to a second configuration, and the eNB 902 may transmit a second RB including CSI-RS ports corresponding to only the first configuration.

In a seventh configuration, the UE 904 receives UE-RS and CSI-RS in at least one RB, and performs time tracking 912 based on the received UE-RS and CSI-RS.

UE-RS Based Timing Estimation

In coordinated multipoint (CoMP) Tx/Rx, control and data may come from different cells. Thus, there may be a timing difference between control and data transmissions. If CRS is used to perform time tracking, a control channel may be tracked, and may have the correct timing. However, the timing of a data channel may be misaligned. Accordingly, use of CRS may be inappropriate for time tracking in such a scenario.

In an aspect, UE-RS may be used to improve the time tracking. Because the UE-RS is bound to data, a UE-RS signal may be used to measure timing for the data channel. Time tracking based on UE-RS may be applied when transmissions via antenna ports 7 and 8 have different timing.

In principle, a timing error $\Delta t$ of a channel in the time domain corresponds to phase ramping in the frequency domain. A channel h may be defined by the equation:

$$h(k,m,n) = h_0(k,m,n)e^{-j n \omega \Delta t} + n_0(k,m,n), \quad (1)$$

where $h_0$ is the original channel, k is a resource block (RB) index, m is a symbol index, n is a tone index, and $n_0$ is an additive white Gaussian noise (AWGN) component.

Figure 10:
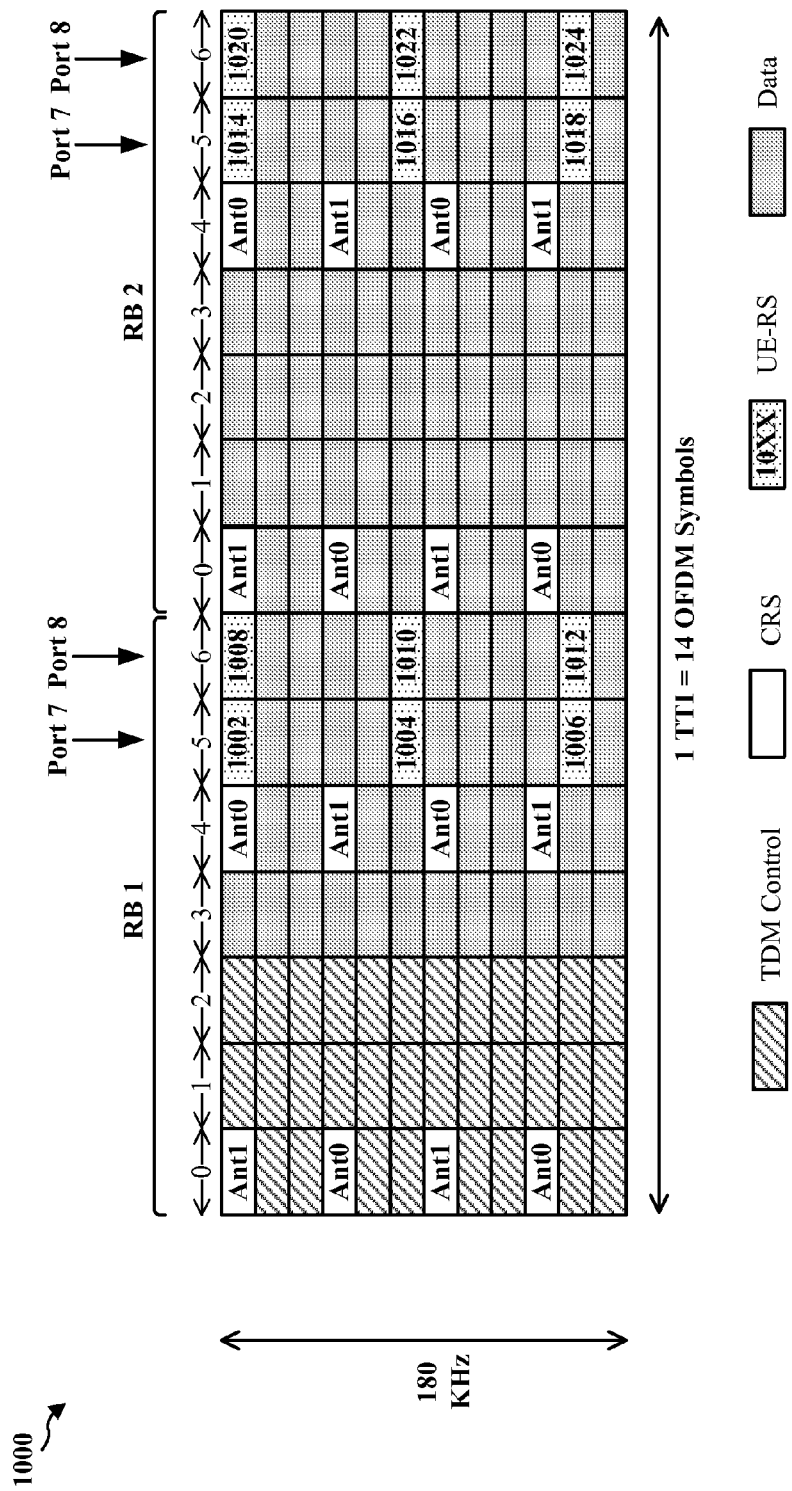
FIG. 10 is a diagram illustrating positions of UE-RS signals received via antenna ports 7 and 8 in a subframe.

FIG. 10 is a diagram 1000 illustrating positions of UE-RS signals received via antenna ports 7 and 8 in a subframe. An original UE-RS signal may be defined as x, where x is a multiplexed signal having antenna port 7 and antenna port 8 transmissions multiplexed on one resource. The antenna port 7 and antenna port 8 transmissions may have the same or different phase ramping. For a resource pair (e.g., a pair or resources of adjacent OFDM symbols having the same tone and within the same RB), each resource may receive an original UE-RS signal x having multiplexed antenna port 7 and antenna port 8 transmissions defined by the following equations:

$$x_1(k,m,n) = h\_P7 + h\_P8 = a; \text{ and} \quad (2)$$

$$x_2(k,m+1,n) = h\_P7 - h\_P8 = b, \quad (3)$$

where $x_1$ is the original UE-RS signal received in the first resource of the resource pair, $x_2$ is the original UE-RS signal received in the second resource of the resource pair, k is a resource block (RB) index, m is a symbol index, n is a tone index, h_P7 is the antenna port 7 transmission, and h_P8 is the antenna port 8 transmission.

After the original UE-RS signal x is received, x may be de-multiplexed or de-spread. y may be defined as the received UE-RS signal after de-spreading. With reference to Equations (2) and (3) above, for the resource pair, the value of y in each resource is determined by the following equations:

$$y_1(k,m,n) = h\_P7 = (a+b)/2; \text{ and} \quad (4)$$

$$y_2(k,m+1,n) = h\_P8 = (a-b)/2, \quad (5)$$

where $y_1$ is the value of the de-spread UE-RS signal in the first resource of the resource pair, and $y_2$ is the value of the de-spread UE-RS signal in the second resource of the resource pair. For example, in FIG. 10, for a pair of resources 1002 and 1008, $y_1$ is the value of the de-spread UE-RS signal in the resource 1002, and $y_2$ is the value of the de-spread UE-RS signal in the resource 1008.

Referring to FIG. 10, after the original UE-RS signal is de-spread, a total of six y values (i.e., six de-spread UE-RS signal values) in each RB may be determined. For example, in RB 1, y values may be determined at resources 1002, 1004, and 1006 in OFDM symbol 5 and at resources 1008, 1010, and 1012 in OFDM symbol 6. In RB 2, y values may be determined at resources 1014, 1016, and 1018 in OFDM symbol 5 and at resources 1020, 1022, and 1024 in OFDM symbol 6. Accordingly, the subframe comprising RBs 1 and 2 may have a total of 12 y values.

Furthermore, the de-spread UE-RS signal values may be used for channel estimation of a specific antenna port. For example, referring to FIG. 10, the UE-RS signal values at the resources 1002, 1004, and 1006 in OFDM symbol 5 of RB 1, and the UE-RS signal values at the resources 1014, 1016, and 1018 in OFDM symbol 5 of RB 2, may be used for channel estimation for antenna port 7. Also, the UE-RS signal values at the resources 1008, 1010, and 1012 in OFDM symbol 6 of RB 1, and the UE-RS signal values at the resources 1020, 1022, and 1024 in OFDM symbol 6 of RB 2, may be sued for channel estimation for antenna port 8.

In FIG. 10, it is noted that within an OFDM symbol, each UE-RS signal is separated from a nearest adjacent UE-RS signal by a distance of five tones. In an aspect, it is assumed that an original channel $h_0$ (without phase ramping) remains constant over two adjacent UE-RS signal values (75 kHz coherent bandwidth) in an OFDM symbol. Hence, $h_0(k, m, n) \approx h_0(k, m, n+5)$, where k is a resource block (RB) index, m is a symbol index, and n is a tone index.

Moreover, in each OFDM symbol, there are three UE-RS signal values that are assumed to be equal, wherein the three UE-RS signal values correspond to two pairs. For example, in FIG. 10, the UE-RS signal values at the resources 1002, 1004, and 1006 in OFDM symbol 5 of RB 1 are assumed to be equal, and correspond to two pairs. The first pair may include a first UE-RS signal value at the resource 1002 and a second UE-RS signal value at the resource 1004. The second pair may include the second UE-RS signal value at the resource 1004 and a third UE-RS signal value at the resource 1006. A similar pairing configuration applies to the UE-RS signal values in OFDM symbol 6 of RB 1 and OFDM symbols 5 and 6 of RB 2.

If it is assumed that the original channel $h_0$ in each pair is constant, and if there is no timing error between the first and second UE-RS signal values of the first pair, then the channel is the same. Furthermore, if there is no timing error between the second and third UE-RS signal values of the second pair, then the channel is the same. Accordingly, a connection may be drawn between y values in an OFDM symbol that is defined by the following equation:

$$y(k,m,n+5) = y(k,m,n)e^{-j\omega 5 \Delta \tau} \xi(k,m,n), \quad (6)$$

where k is a resource block (RB) index, m is a symbol index, n is a tone index, and is a noise component. Equation (6) may be used to perform timing estimation. For example, from Equation (6), a maximum ratio combiner (MRC) may be used to estimate a frequency ramping term (e.g. construct a sample) from y.

In a configuration, the UE 904 receives at least one resource blocks in a transmission, each of the at least one resource blocks comprising a first group of UE-reference signals (UE-RS) associated with a first antenna port. The UE 904 then determines whether the at least one resource blocks comprise a second group of UE-RS associated with one or more other antenna ports, and processes the received at least one resource blocks based on the first group of UE-RS, and further based on the second group of UE-RS when the at least one resource blocks is determined to comprise the second group of UE-RS. The transmission may be associated with a control channel transmission, a data channel transmission, or a combination thereof.

The UE 904 may process the received at least one resource blocks by constructing a number of samples for performing at least one of channel estimation or timing estimation. The first group of UE-RS and the second group of UE-RS may be multiplexed in a code domain sharing the same frequency-time resources. Moreover, the first group of UE-RS and the second group of UE-RS may be transmitted in orthogonal frequency-time resources. Also, a same precoding may be applied to the first group of UE-RS and the second group of UE-RS.

If downlink control information (DCI) signals a rank 2 transmission or transmission greater than rank 2, then the transmission from the first antenna port and the one or more antenna ports come from the same evolved Node B (eNB), and thus have a common phase ramping. Accordingly, the UE 904 determines that the at least one resource blocks comprise the second group of UE-RS and constructs samples based on the first group of UE-RS associated with the first antenna port and samples based on the second group of UE-RS associated with the one or more other antenna ports for each of the at least one resource blocks. Thereafter, the UE 904 processes the received at least one resource blocks by processing the combined samples based on the first group of UE-RS and based on the second group of UE-RS.

If the DCI signals a rank 1 transmission, then the UE 904 determines whether the transmission is a single-user transmission or a multi-user transmission. The UE 904 may utilize a single-user/multi-user detector to distinguish between the single-user transmission and the multi-user transmission. Otherwise, the UE 904 may determine the transmission to be the single-user transmission or the multi-user transmission according to a bit received from an eNB indicating either the single-user transmission or the multi-user transmission.

When the UE 904 determines the transmission to be the single-user transmission, the UE 904 determines that the at least one resource blocks does not comprise the second group of UE-RS associated with a second antenna port. Accordingly, the UE 904 constructs samples based on the first group of UE-RS associated with the first antenna port for each of the at least one resource blocks. Thereafter, the UE 904 processes the received at least one resource blocks by processing the constructed samples based on the first group of UE-RS associated with the first antenna port.

When the UE 904 determines the transmission to be the multi-user transmission, the UE 904 determines that the at least one resource blocks comprise the second group of UE-RS associated with a second antenna port. Here, the transmissions received via the first antenna port and the second antenna port may come from different eNBs, and therefore may have different phase ramping. As such, because the transmissions cannot be combined, the transmissions associated with the first antenna port and the second antenna port should be estimated separately. Accordingly, the UE 904 further determines whether the first group of UE-RS and second group of UE-RS are received from a same eNB or different eNBs. The UE 904 may utilize a single-user/multi-user detector to determine whether the first group of UE-RS and second group of UE-RS are received from the same eNB or different eNBs.

When the first group of UE-RS and second group of UE-RS are received from the same eNB, the UE 904 constructs samples based on the first group of UE-RS associated with the first antenna port and samples based on the second group of UE-RS associated with the second antenna port for each of the at least one resource blocks. Thereafter, the UE 904 processes the received at least one resource blocks by processing the combined samples based on the first group of UE-RS and based on the second group of UE-RS.

When the first group of UE-RS and second group of UE-RS are received from different eNBs, the UE 904 constructs samples based on the first group of UE-RS associated with the first antenna port for each of the at least one resource blocks. Thereafter, the UE 904 processes the received at least one resource blocks by processing the constructed samples based on the first group of UE-RS associated with the first antenna port.

Alternatively, when the first group of UE-RS and second group of UE-RS are received from different eNBs, the UE 904 constructs samples based on the second group of UE-RS associated with the second antenna port for each of the at least one resource blocks. Thereafter, the UE 904 processes the received at least one resource blocks by processing the constructed samples based on the second group of UE-RS associated with the second antenna port.

Figure 11:
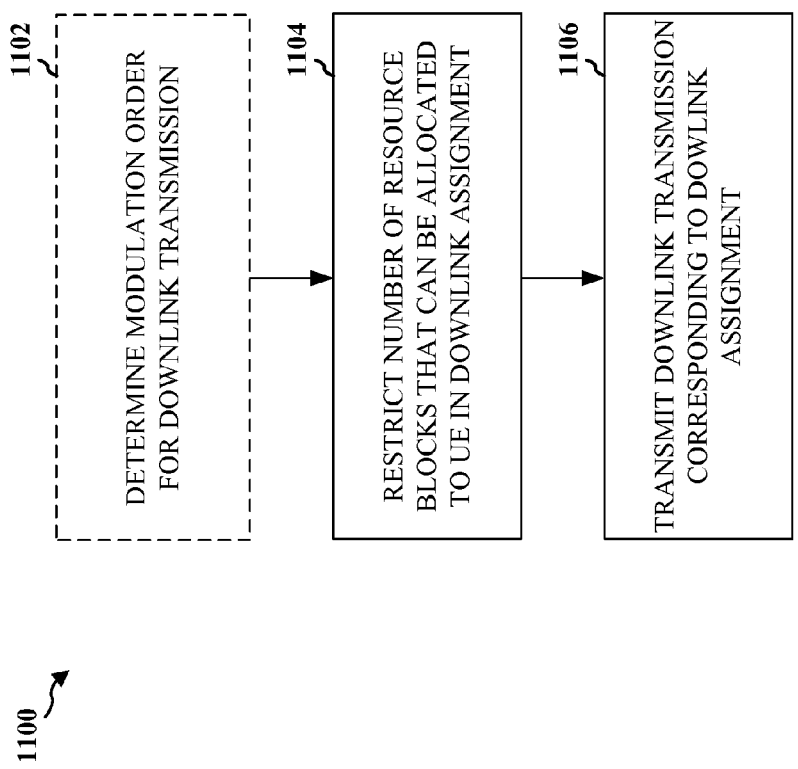
FIG. 11 is a flow chart of a method of wireless communication.

FIG. 11 is a flow chart 1100 of a method of wireless communication. The method may be performed by an eNB. At step 1102, the eNB may determine a modulation order for a downlink transmission.

At step 1104, the eNB restricts a number of resource blocks that can be allocated to a user equipment (UE) in a downlink assignment to be greater than or equal to N, where N is greater than one. The restriction may be based on the determined modulation order. For example, the eNB may restrict the number of resource blocks that can be allocated to the UE in the downlink assignment to be greater than or equal to two only when the modulation order is greater than a threshold.

At step 1106, the eNB transmits to the UE the downlink transmission corresponding to the downlink assignment.

Figure 12:
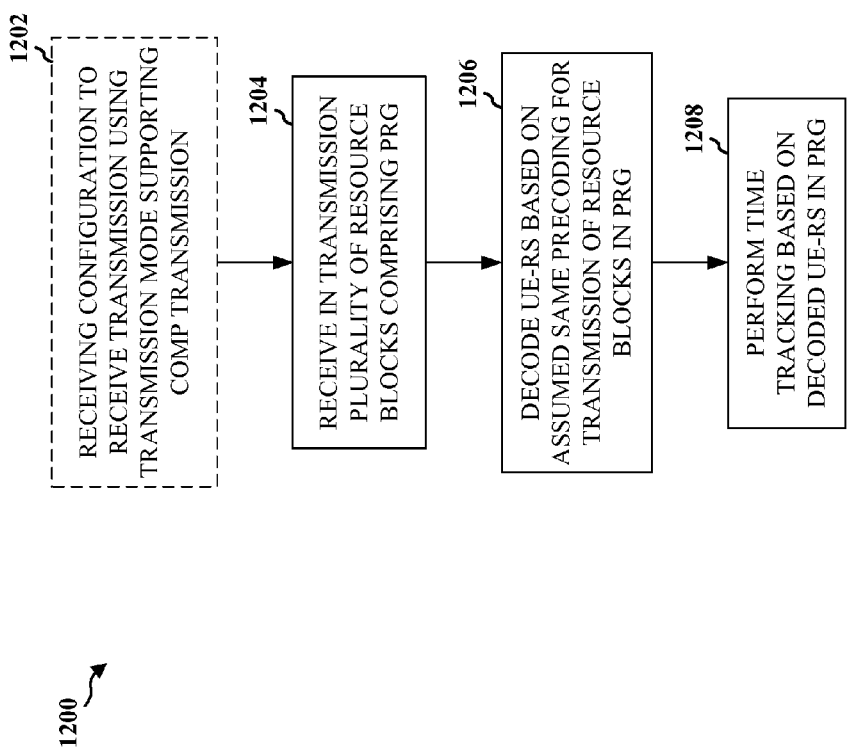
FIG. 12 is a flow chart of a method of wireless communication.

FIG. 12 is a flow chart 1200 of a method of wireless communication. The method may be performed by a UE. At step 1202, the UE may receive a configuration to receive a transmission using a transmission mode supporting cooperative multipoint (CoMP) transmission.

At step 1204, the UE receives a plurality of resource blocks in a transmission. The plurality of resource blocks may include a precoding resource block group (PRG).

At step 1206, the UE decodes user equipment specific reference signals (UE-RS) based on an assumed same precoding for transmission of the resource blocks in the PRG. Thereafter, at step 1208, the UE performs time tracking based on the decoded UE-RS in the PRG.

Figure 13:
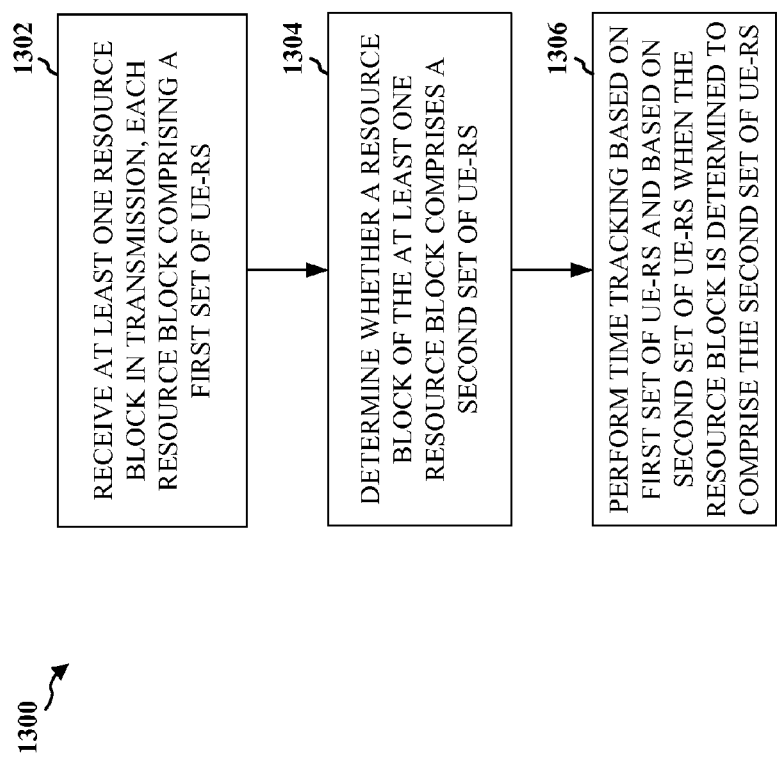
FIG. 13 is a flow chart of a method of wireless communication.

FIG. 13 is a flow chart 1300 of a method of wireless communication. The method may be performed by a UE. At step 1302, the UE receives at least one resource block in a transmission. The transmission may be a rank one transmission or a rank two transmission. Each of the at least one resource block may include a first set of user equipment specific reference signals (UE-RS).

At step 1304, the UE determines whether a resource block of the at least one resource block includes a second set of UE-RS. In an aspect, the determination of whether the resource block of the at least one resource block includes the second set of UE-RS is performed only when the at least one resource block comprises only the resource block. In another aspect, the determination includes performing blind detection to determine whether the resource block includes the second set of UE-RS. In a further aspect, the determination includes receiving from an eNB information indicating whether the resource block includes the second set of UE-RS.

At step 1306, the UE performs time tracking based on the first set of UE-RS and based on the second set of UE-RS when the resource block is determined to comprise the second set of UE-RS.

In an aspect, the transmission may be meant for the UE, the first set of UE-RS may be meant for the UE, and the second set of UE-RS may be meant for another UE or no other UEs. Accordingly, the first set of UE-RS and the second set of UE-RS may have a different precoding. Alternatively, the first set of UE-RS and the second set of UE-RS may have the same precoding.

Figure 14:
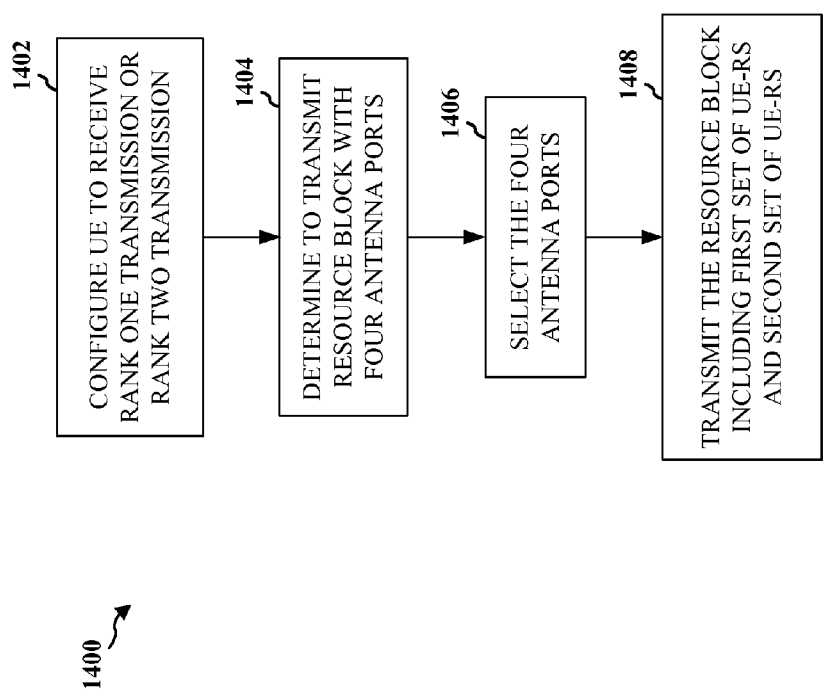
FIG. 14 is a flow chart of a method of wireless communication.

FIG. 14 is a flow chart 1400 of a method of wireless communication. The method may be performed by an eNB. At step 1402, the eNB configures a user equipment (UE) to receive one of a rank one transmission or a rank two transmission.

At step 1404, the eNB determines to transmit a resource block with four antenna ports. At step 1406, the eNB selects the four antenna ports. The selected four antenna ports may be antenna ports 7, 8, 11, and 13. Alternatively, the selected four antenna ports may be antenna ports 9, 10, 12, and 14.

At step 1408, the eNB transmits the resource block to the UE. The resource block may include a first set of user equipment specific reference signals (UE-RS) and a second set of UE-RS. One of the first set of UE-RS and the second set of UE-RS may be meant for the UE. The other one of the first set of UE-RS and the second set of UE-RS may be meant for another UE or no other UEs.

The first set of UE-RS may include 12 UE-RS and the second set of UE-RS may include 12 UE-RS for a total of 24 UE-RS. The resource block may be transmitted with a set of resource blocks. Moreover, the second set of UE-RS may include at least one UE-RS when a number of resource blocks in the set of resource blocks is less than a threshold number.

In an aspect, the same precoding may be used for the first set of UE-RS and the second set of UE-RS. Alternatively, different precoding may be used for the first set of UE-RS and the second set of UE-RS, wherein the other one of the first set of UE-RS and the second set of UE-RS is meant for the other UE.

In a further aspect, the antenna ports 7, 8, 11, and 13 provide a mapping of UE-RS to the first set of UE-RS, wherein the first set of UE-RS is meant for the UE and the second set of UE-RS is meant for no other UEs. Accordingly, the eNB may include the second set of UE-RS in the resource block to enable the UE to perform time tracking based on both the first set of UE-RS and the second set of UE-RS.

In another aspect, the antenna ports 9, 10, 12, and 14 provide a mapping of UE-RS to the second set of UE-RS, wherein the second set of UE-RS is meant for the UE and the first set of UE-RS is meant for no other UEs. Accordingly, the eNB may include the first set of UE-RS in the resource block to enable the UE to perform time tracking based on both the first set of UE-RS and the second set of UE-RS.

Figure 15:
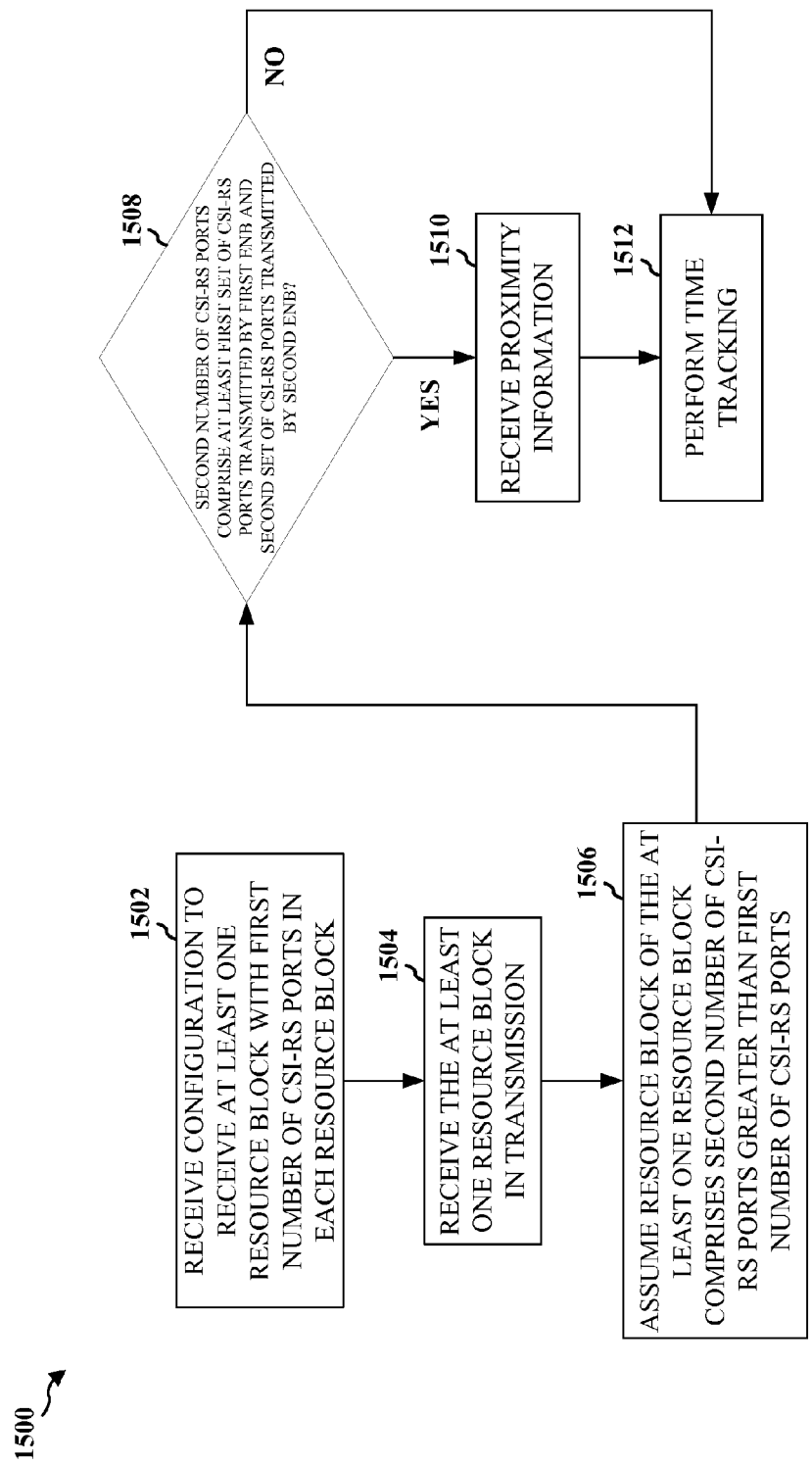
FIG. 15 is a flow chart of a method of wireless communication.

FIG. 15 is a flow chart 1500 of a method of wireless communication. The method may be performed by a UE. At step 1502, the UE receives a configuration to receive at least one resource block with a first number of channel state information reference signal (CSI-RS) ports in each resource block of the at least one resource block. At step 1504, the UE receives the at least one resource block in a transmission.

At step 1506, the UE assumes a resource block of the at least one resource block includes a second number of CSI-RS ports greater than the first number of CSI-RS ports. The UE assumes the resource block to comprise the second number of CSI-RS ports when the at least one resource block comprises less than a threshold number of resource blocks and the first number of CSI-RS ports is less than a threshold number of CSI-RS ports.

At step 1508, the UE determines whether the second number of CSI-RS ports comprises at least a first set of CSI-RS ports transmitted by a first eNB and a second set of CSI-RS ports transmitted by a second eNB. Based on a negative outcome, the UE proceeds to step 1512 to perform time tracking based on signals in resource elements corresponding to the assumed second number of CSI-RS ports.

At step 1510, based on a positive outcome at step 1508, the UE receives proximity information from a serving eNB. The proximity information may indicate one of a distance from each of the first eNB and the second eNB, a propagation time from each of the first eNB and the second eNB, a relationship between the distance from the first eNB and the second eNB, or a relationship between the propagation time from the first eNB and the second eNB. Thereafter, at step 1512, the UE performs the time tracking further based on the received proximity information.

Figure 16:
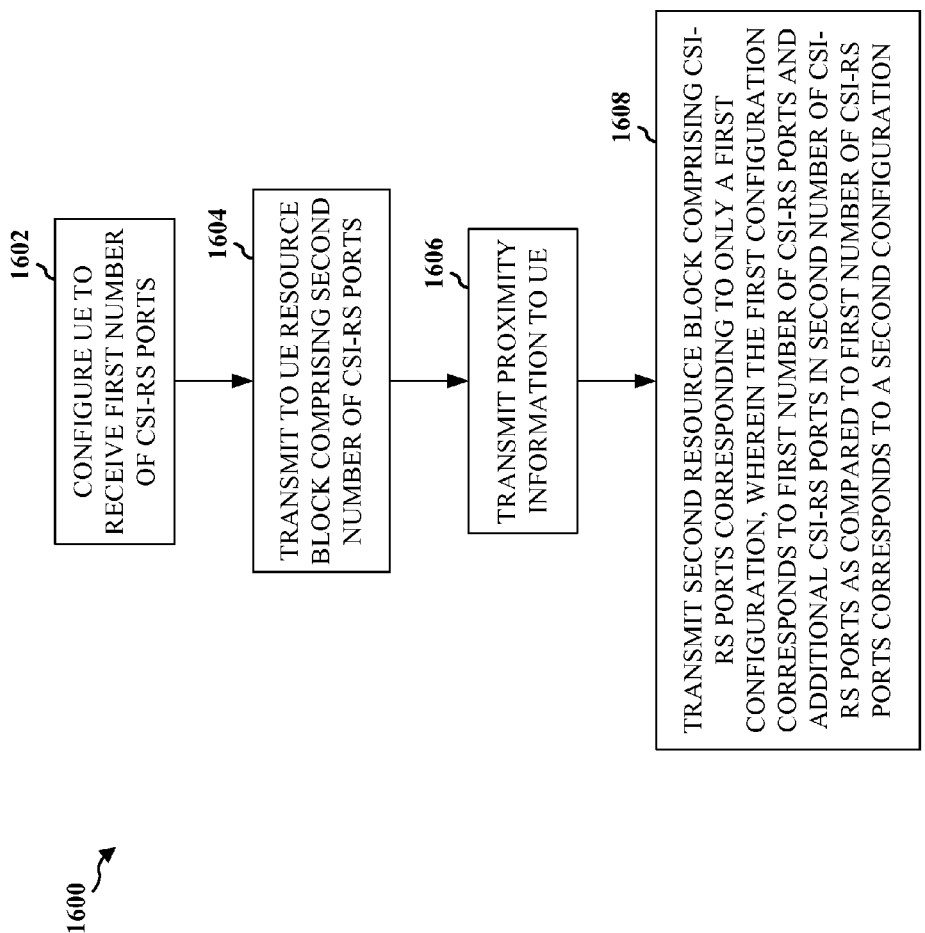
FIG. 16 is a flow chart of a method of wireless communication.

FIG. 16 is a flow chart 1600 of a method of wireless communication. The method may be performed by an eNB. At step 1602, the eNB configures a user equipment (UE) to receive a first number of channel state information reference signal (CSI-RS) ports.

At step 1604, the eNB transmits to the UE a resource block comprising a second number of CSI-RS ports greater than the first number of CSI-RS ports. The second number of CSI-RS ports enables improved time tracking by the UE. In an aspect, the first number of CSI-RS ports corresponds to a first set of CSI-RS ports, additional CSI-RS ports in the second number of CSI-RS ports correspond to a second set of CSI-RS ports, and the same precoding is applied to the first set of CSI-RS ports and the second set of CSI-RS ports in the transmitted resource block.

At step 1606, the eNB transmits proximity information to the UE. The proximity information may include one of a distance between the UE and the eNB and a distance between the UE and a second eNB, a propagation time from the eNB to the UE and from the second eNB to the UE, a relationship between the distance from the eNB and the second eNB, or a relationship between the propagation time from the eNB and the second eNB.

In an aspect, the first number of CSI-RS ports may correspond to a first configuration and additional CSI-RS ports in the second number of CSI-RS ports as compared to the first number of CSI-RS ports may correspond to a second configuration. Accordingly, at step 1608, the eNB may transmit a second resource block comprising CSI-RS ports corresponding to only the first configuration.

Figure 17:
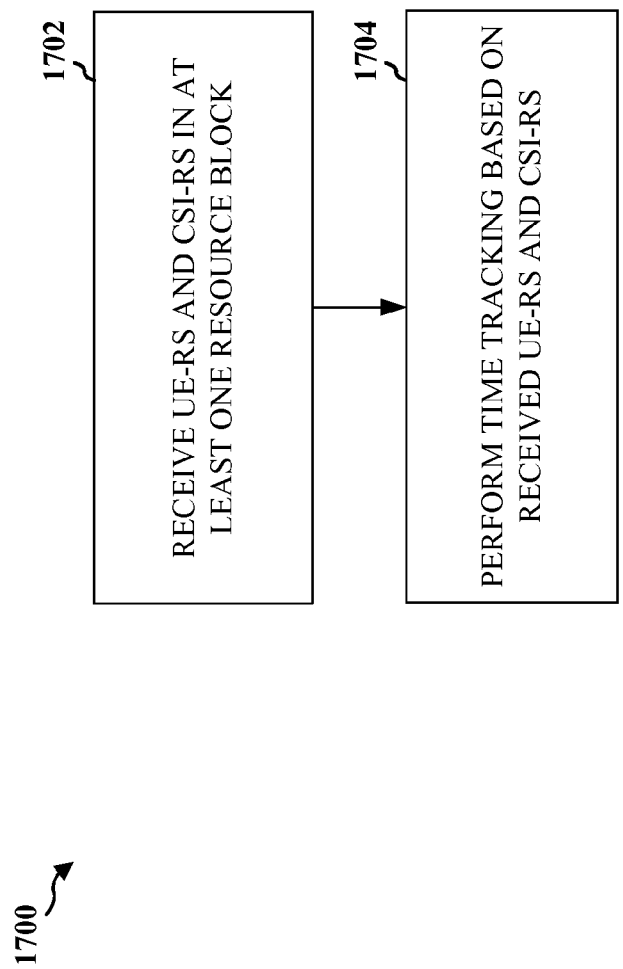
FIG. 17 is a flow chart of a method of wireless communication.

FIG. 17 is a flow chart 1700 of a method of wireless communication. The method may be performed by a UE. At step 1702, the UE receives user equipment specific reference signals (UE-RS) and channel state information reference signals (CSI-RS) in at least one resource block. At step 1704, the UE performs time tracking based on the received UE-RS and CSI-RS.

Figure 18:
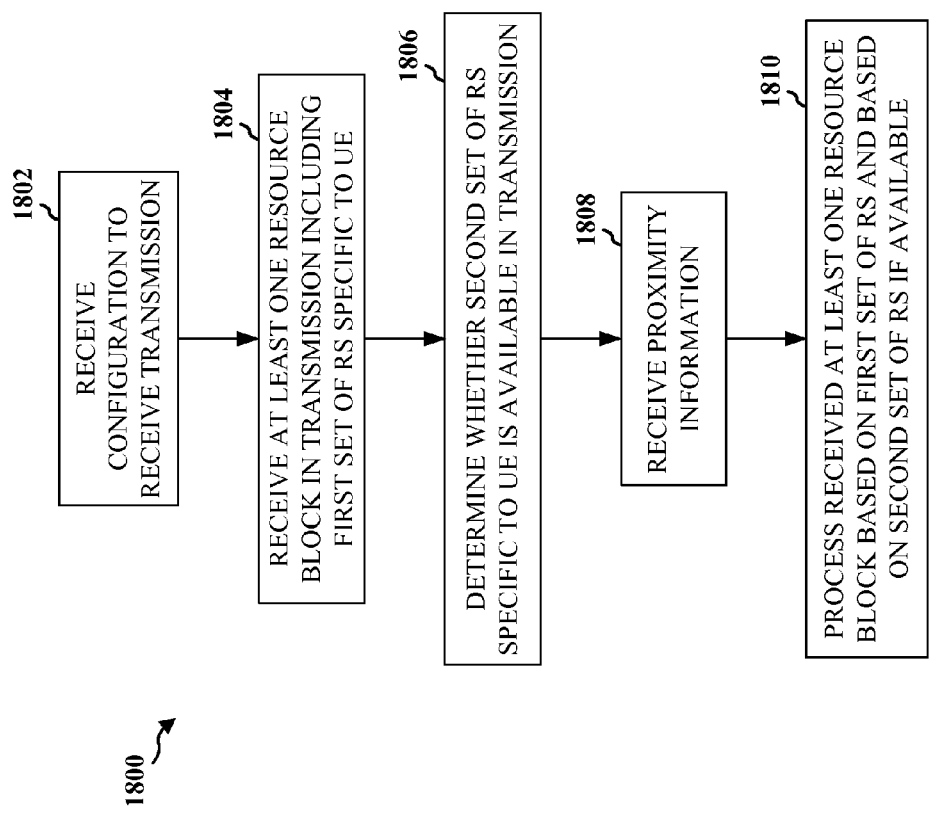
FIG. 18 is a flow chart of a method of wireless communication.

FIG. 18 is a flow chart 1800 of a method of wireless communication. The method may be performed by a UE. At step 1802, the UE may receive a configuration to receive a transmission using a transmission mode supporting cooperative multipoint (CoMP) transmission. At step 1804, the UE receives at least one resource block in the transmission. The at least one resource block includes a first set of reference signals (RS), specific to the UE.

At step 1806, the UE determines whether a second set of RS, specific to the UE, is available in the transmission. The determining operation may include the UE performing blind detection to determine the availability of the second set of RS. Alternatively, the determining operation may include the UE receiving from an evolved Node B (eNB) information indicating whether the second set of RS is available or not.

At step 1808, the UE may receive proximity information from the eNB. The proximity information may include a propagation time difference of the first set of RS and the second set of RS. Thereafter, at step 1810, the UE processes the received at least one resource block based on the first set of RS and further based on the second set of RS if the second set of RS is determined to be available. The processing may include performing channel estimation and/or timing estimation.

In an aspect, the first set of RS and the second set of RS are UE-specific RS (UE-RS) for demodulation. The first set of UE-RS and the second set of UE-RS may have a different precoding or the same precoding. The availability of the second set of UE-RS may be determined when the second set of UE-RS is contained within the at least one resource block. Alternatively, the availability of the second set of UE-RS may be determined when a resource block comprising the second set of UE-RS is associated with a same precoding resource block group (PRG) as the at least one resource block. In another aspect, the transmission may be for the UE, the first set of UE-RS may be for the UE, and the second set of UE-RS may be for another UE or no other UEs.

In a further aspect, the first set of RS and the second set of RS are channel state information reference signals (CSI-RS). The first set of CSI-RS and the second set of CSI-RS may be associated with different resources. Alternatively, the first set of CSI-RS and the second set of CSI-RS may be associated with a same set of resources but with different antenna ports. Moreover, the same precoding may be applied to a first set of CSI-RS ports and a second set of CSI-RS ports in a transmitted resource block.

In yet another aspect, the first set of RS may include UE-specific RS (UE-RS) for demodulation and the second set of RS may include channel state information reference signals (CSI-RS).

Figure 19:
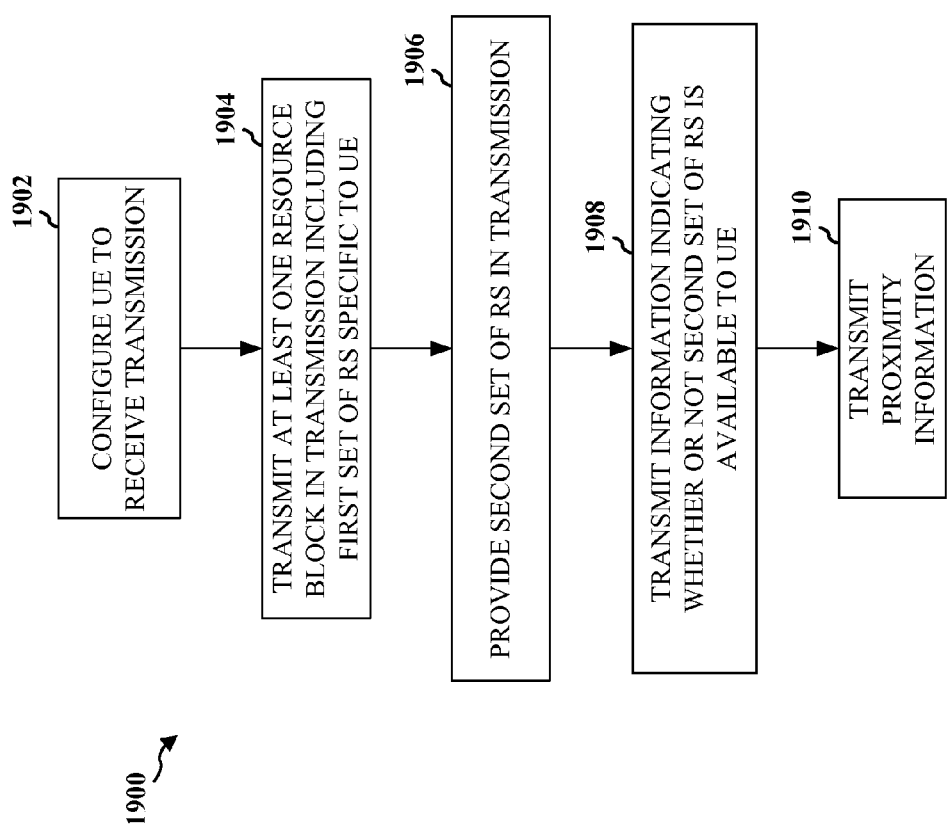
FIG. 19 is a flow chart of a method of wireless communication.

FIG. 19 is a flow chart 1900 of a method of wireless communication. The method may be performed by an evolved Node B (eNB). At step 1902, the eNB configures a user equipment (UE) to receive a transmission. This may include the eNB transmitting to the UE a configuration to receive the transmission using a transmission mode supporting cooperative multipoint (CoMP) transmission.

At step 1904, the eNB transmits to the UE at least one resource block in the transmission. The at least one resource block includes a first set of reference signals (RS), specific to the UE. At step 1906, the eNB provides a second set of RS in the transmission.

At step 1908, the eNB may transmit to the UE information indicating whether or not the second set of RS is available to the UE. At step 1910, the eNB may also transmit to the UE proximity information. The proximity information includes a propagation time difference of the first set of RS and the second set of RS. Accordingly, the UE may perform channel estimation and/or timing estimation based on the first set of RS and further based on the second set of RS if the second set of RS is available to the UE.

In an aspect, the first set of RS and the second set of RS are UE-specific RS (UE-RS) for demodulation. The first set of UE-RS and the second set of UE-RS may have a different precoding or the same precoding. The second set of UE-RS may be available to the UE when the second set of UE-RS is contained within the at least one resource block. Alternatively, the second set of UE-RS may be available to the UE when a resource block comprising the second set of UE-RS is associated with a same precoding resource block group (PRG) as the at least one resource block. In another aspect, the transmission may be for the UE, the first set of UE-RS may be for the UE, and the second set of UE-RS may be for another UE or no other UEs.

In a further aspect, the first set of RS and the second set of RS are channel state information reference signals (CSI-RS). The first set of CSI-RS and the second set of CSI-RS may be associated with different resources. Alternatively, the first set of CSI-RS and the second set of CSI-RS may be associated with a same set of resources but with different antenna ports. Moreover, the same precoding may be applied to a first set of CSI-RS ports and a second set of CSI-RS ports in a transmitted resource block.

In yet another aspect, the first set of RS includes UE-specific RS (UE-RS) for demodulation and the second set of RS includes channel state information reference signals (CSI-RS).

Figure 20:
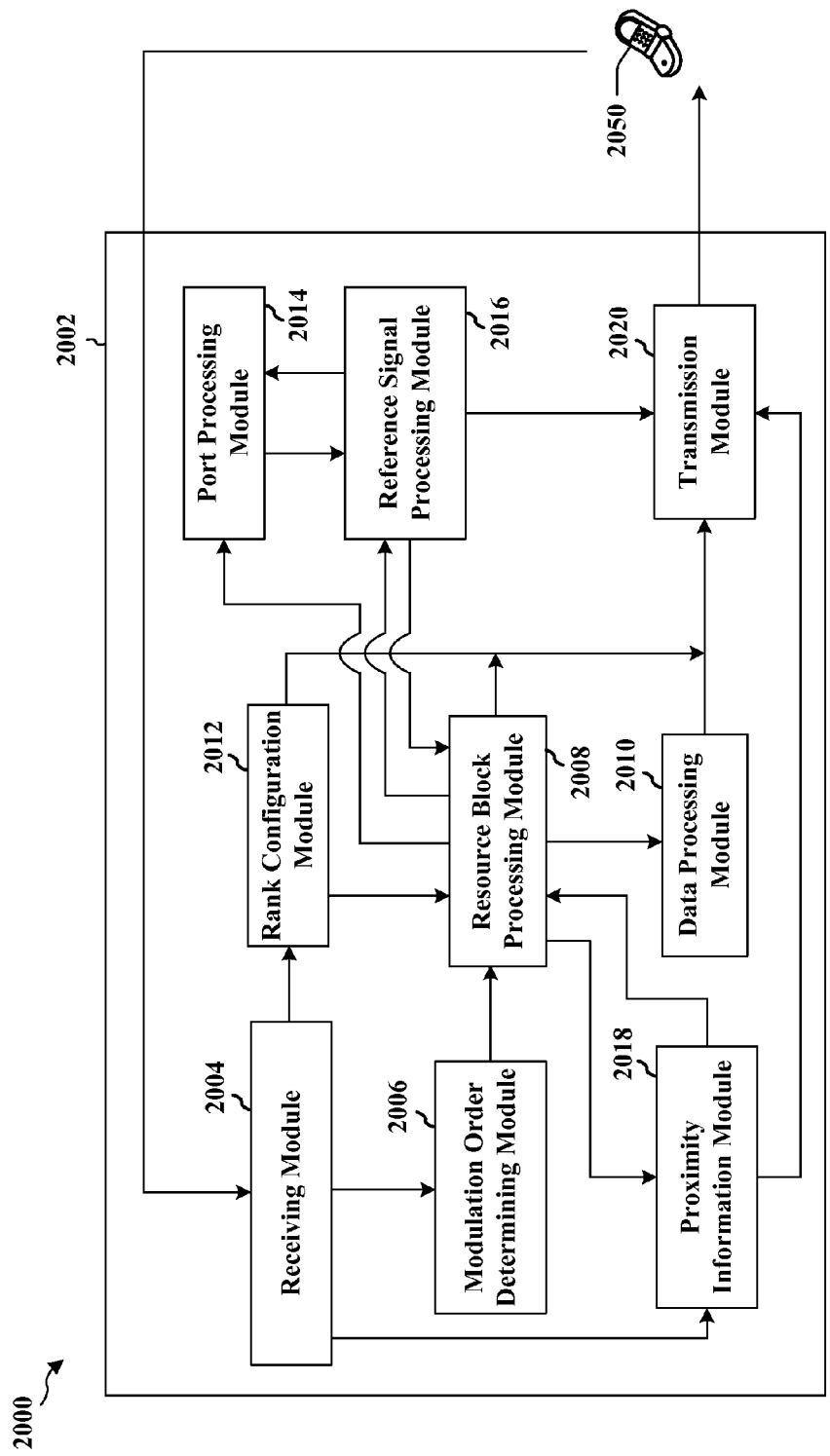
FIG. 20 is a conceptual data flow diagram illustrating the data flow between different modules/means/components in an exemplary apparatus.

FIG. 20 is a conceptual data flow diagram 2000 illustrating the data flow between different modules/means/components in an exemplary apparatus 2002. The apparatus may be an eNB. The apparatus includes a receiving module 2004, a modulation order determining module 2006, a resource block processing module 2008, a data processing module 2010, a rank configuration module 2012, a port processing module 2014, a reference signal processing module 2016, a proximity information module 2018, and a transmission module 2020.

The modulation order determining module 2006 may determine a modulation order for a downlink transmission. The resource block processing module 2008 restricts a number of resource blocks that can be allocated to a user equipment (UE) 2050 in a downlink assignment to be greater than or equal to N, where N is greater than one. The restriction may be based on the modulation order determined by the modulation order determining module 2006. For example, the resource block processing module 2008 may restrict the number of resource blocks that can be allocated to the UE 2050 in the downlink assignment to be greater than or equal to two only when the modulation order is greater than a threshold. The data processing module 2010 may transmit to the UE 2050 the downlink transmission corresponding to the downlink assignment.

The rank configuration module 2012 configures the UE 2050 to receive one of a rank one transmission or a rank two transmission. The resource block processing module 2008 may determine to transmit a resource block with four antenna ports. As such, the port processing module 2014 selects the four antenna ports. The selected four antenna ports may be antenna ports 7, 8, 11, and 13. Alternatively, the selected four antenna ports may be antenna ports 9, 10, 12, and 14.

The resource block processing module 2008 transmits the resource block to the UE 2050 via the transmission module 2020. The resource block may include a first set of user equipment specific reference signals (UE-RS) and a second set of UE-RS generated by the reference signal processing module 2016. One of the first set of UE-RS and the second set of UE-RS may be meant for the UE 2050. The other one of the first set of UE-RS and the second set of UE-RS may be meant for another UE or no other UEs.

The first set of UE-RS may include 12 UE-RS and the second set of UE-RS may include 12 UE-RS for a total of 24 UE-RS. The resource block may be transmitted with a set of resource blocks. Moreover, the second set of UE-RS may include at least one UE-RS when a number of resource blocks in the set of resource blocks is less than a threshold number.

In an aspect, the same precoding may be used for the first set of UE-RS and the second set of UE-RS. Alternatively, different precoding may be used for the first set of UE-RS and the second set of UE-RS, wherein the other one of the first set of UE-RS and the second set of UE-RS is meant for the other UE.

In a further aspect, the antenna ports 7, 8, 11, and 13 provide a mapping of UE-RS to the first set of UE-RS, wherein the first set of UE-RS is meant for the UE 2050 and the second set of UE-RS is meant for no other UEs. Accordingly, the resource block processing module 2008 may include the second set of UE-RS in the resource block to enable the UE 2050 to perform time tracking based on both the first set of UE-RS and the second set of UE-RS.

In another aspect, the antenna ports 9, 10, 12, and 14 provide a mapping of UE-RS to the second set of UE-RS, wherein the second set of UE-RS is meant for the UE 2050 and the first set of UE-RS is meant for no other UEs. Accordingly, the resource block processing module 2008 may include the first set of UE-RS in the resource block to enable the UE 2050 to perform time tracking based on both the first set of UE-RS and the second set of UE-RS.

The reference signal processing module 2016 configures the UE 2050 to receive a first number of channel state information reference signal (CSI-RS) ports. The resource block processing module 2008 transmits to the UE 2050 a resource block comprising a second number of CSI-RS ports greater than the first number of CSI-RS ports. The second number of CSI-RS ports enables improved time tracking by the UE 2050. In an aspect, the first number of CSI-RS ports corresponds to a first set of CSI-RS ports, additional CSI-RS ports in the second number of CSI-RS ports correspond to a second set of CSI-RS ports, and the same precoding is applied to the first set of CSI-RS ports and the second set of CSI-RS ports in the transmitted resource block.

The proximity information module 2018 may determine proximity information via signals received through the receiving module 2004 and transmits the proximity information to the UE 2050. The proximity information may include one of a distance between the UE 2050 and the apparatus 2002 and a distance between the UE 2050 and another eNB, a propagation time from the apparatus 2002 to the UE 2050 and from the other eNB to the UE 2050, a relationship between the distance from the apparatus 2002 and the other eNB, or a relationship between the propagation time from the apparatus 2002 and the other eNB.

In an aspect, the first number of CSI-RS ports may correspond to a first configuration and additional CSI-RS ports in the second number of CSI-RS ports as compared to the first number of CSI-RS ports may correspond to a second configuration. Accordingly, the resource block processing module 2008 may transmit a second resource block comprising CSI-RS ports corresponding to only the first configuration.

In an aspect, the rank configuration module 2012 and/or the modulation order determining module 2006 configures a user equipment (UE) 2050 to receive a transmission. This may include the transmission module 2020 transmitting to the UE 2050 a configuration to receive the transmission using a transmission mode supporting cooperative multipoint (CoMP) transmission.

The resource block processing module 2008 transmits to the UE 2050 (via the transmission module 2020) at least one resource block in the transmission. The at least one resource block includes a first set of reference signals (RS), specific to the UE 2050. The resource block processing module 2008 also provides a second set of RS in the transmission.

The reference signal processing module 2016 may transmit to the UE 2050 (via the transmission module 2020) information indicating whether or not the second set of RS is available to the UE 2050. The proximity information module 2018 may also transmit to the UE 2050 proximity information. The proximity information includes a propagation time difference of the first set of RS and the second set of RS. Accordingly, the UE 2050 may perform channel estimation and/or timing estimation based on the first set of RS and further based on the second set of RS if the second set of RS is available to the UE 2050.

In an aspect, the first set of RS and the second set of RS are UE-specific RS (UE-RS) for demodulation. The first set of UE-RS and the second set of UE-RS may have a different precoding or the same precoding. The second set of UE-RS may be available to the UE 2050 when the second set of UE-RS is contained within the at least one resource block. Alternatively, the second set of UE-RS may be available to the UE 2050 when a resource block comprising the second set of UE-RS is associated with a same precoding resource block group (PRG) as the at least one resource block. In another aspect, the transmission may be for the UE 2050, the first set of UE-RS may be for the UE 2050, and the second set of UE-RS may be for another UE or no other UEs.

In a further aspect, the first set of RS and the second set of RS are channel state information reference signals (CSI-RS). The first set of CSI-RS and the second set of CSI-RS may be associated with different resources. Alternatively, the first set of CSI-RS and the second set of CSI-RS may be associated with a same set of resources but with different antenna ports. Moreover, the same precoding may be applied to a first set of CSI-RS ports and a second set of CSI-RS ports in a transmitted resource block.

In yet another aspect, the first set of RS includes UE-specific RS (UE-RS) for demodulation and the second set of RS includes channel state information reference signals (CSI-RS).

The apparatus may include additional modules that perform each of the steps of the algorithm in the aforementioned flow charts of FIGS. 11, 14, 16, and 19. As such, each step in the aforementioned flow charts of FIGS. 11, 14, 16, and 19 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 21:
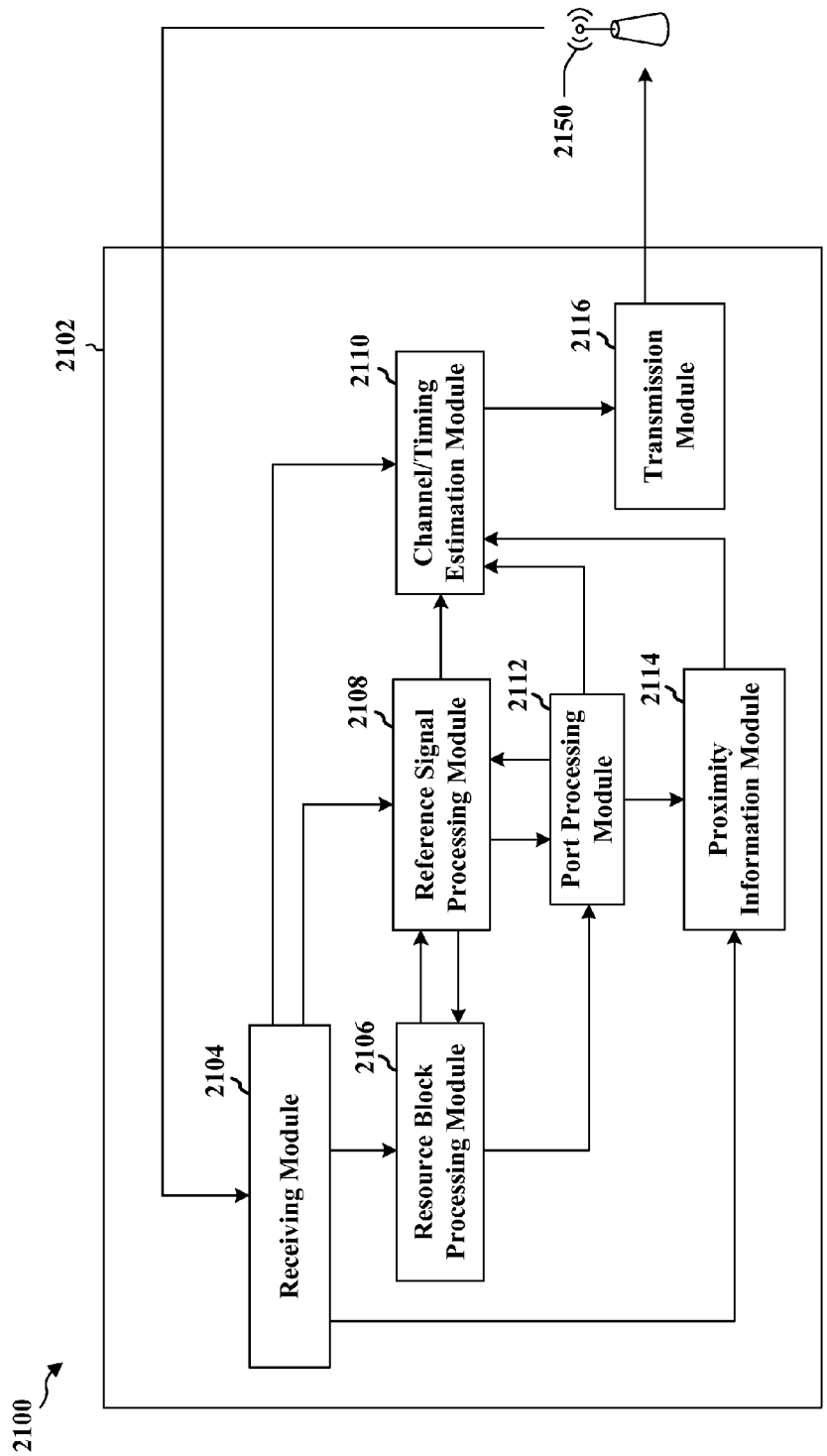
FIG. 21 is a conceptual data flow diagram illustrating the data flow between different modules/means/components in an exemplary apparatus.

FIG. 21 is a conceptual data flow diagram 2100 illustrating the data flow between different modules/means/components in an exemplary apparatus 2102. The apparatus may be a UE. The apparatus includes a receiving module 2104, a resource block processing module 2106, a reference signal processing module 2108, a channel/timing estimation module 2110, a port processing module 2112, a proximity information module 2114, and a transmission module 2116.

In an aspect, the receiving module 2104 may receive a configuration to receive a transmission using a transmission mode supporting cooperative multipoint (CoMP) transmission. Accordingly, the resource block processing module 2106 may receive (via the receiving module 2104) a plurality of resource blocks in a transmission. The plurality of resource blocks may include a precoding resource block group (PRG). The reference signal processing module 2108 may then decode user equipment specific reference signals (UE-RS) based on an assumed same precoding for transmission of the resource blocks in the PRG. Thereafter, the channel/timing estimation module 2110 performs time tracking based on the UE-RS in the PRG decoded by the reference signal processing module 2108.

In another aspect, the resource block processing module 2106 may receive at least one resource block in a transmission. The transmission may be a rank one transmission or a rank two transmission. Moreover, each of the at least one resource block may include a first set of user equipment specific reference signals (UE-RS). The reference signal processing module 2108 may determine whether a resource block of the at least one resource block includes a second set of UE-RS. The determination of whether the resource block of the at least one resource block includes the second set of UE-RS may be performed only when the at least one resource block comprises only the resource block. Alternatively, the determination may include performing blind detection to determine whether the resource block includes the second set of UE-RS. In another alternative, the determination may include receiving from an eNB 2150 information indicating whether the resource block includes the second set of UE-RS. The channel/timing estimation module 2110 may perform time tracking based on the first set of UE-RS and based on the second set of UE-RS when the resource block is determined to include the second set of UE-RS.

In an aspect, the transmission may be meant for the apparatus 2102, the first set of UE-RS may be meant for the apparatus 2102, and the second set of UE-RS may be meant for another UE or no other UEs. Accordingly, the first set of UE-RS and the second set of UE-RS may have a different precoding. Alternatively, the first set of UE-RS and the second set of UE-RS may have the same precoding.

In a further aspect, the receiving module 2104 may receive a configuration to receive at least one resource block with a first number of channel state information reference signal (CSI-RS) ports in each resource block of the at least one resource block. Accordingly, the resource block processing module 2106 may receive (via the receiving module 2104) the at least one resource block in a transmission. The port processing module 2112 may assume a resource block of the at least one resource block includes a second number of CSI-RS ports greater than the first number of CSI-RS ports. Specifically, the port processing module 2112 may assume the resource block to comprise the second number of CSI-RS ports when the at least one resource block comprises less than a threshold number of resource blocks and the first number of CSI-RS ports is less than a threshold number of CSI-RS ports.

The port processing module 2112 also determines whether the second number of CSI-RS ports comprises at least a first set of CSI-RS ports transmitted by a first eNB (e.g., eNB 2150) and a second set of CSI-RS ports transmitted by a second eNB. Based on a negative outcome determined by the port processing module 2112, the channel/timing estimation module 2110 performs time tracking based on signals in resource elements corresponding to the assumed second number of CSI-RS ports. However, based on a positive outcome determined by the port processing module 2112, the proximity information module 2114 receives proximity information from a serving eNB (e.g., eNB 2150). The proximity information may indicate one of a distance from each of the first eNB and the second eNB, a propagation time from each of the first eNB and the second eNB, a relationship between the distance from the first eNB and the second eNB, or a relationship between the propagation time from the first eNB and the second eNB. Thereafter, the channel/timing estimation module 2110 performs the time tracking further based on the received proximity information.

In another aspect, the reference signal processing module 2108 receives (via the receiving module 2104) user equipment specific reference signals (UE-RS) and channel state information reference signals (CSI-RS) in at least one resource block. Thereafter, the channel/timing estimation module 2110 may perform time tracking based on the received UE-RS and CSI-RS.

In a further aspect, the receiving module 2104 may receive a configuration to receive a transmission using a transmission mode supporting cooperative multipoint (CoMP) transmission. The resource block processing module 2106 receives (via the receiving module 2104) at least one resource block in the transmission. The at least one resource block may include a first set of reference signals (RS), specific to the apparatus 2102.

The reference signal processing module 2108 determines whether a second set of RS, specific to the apparatus 2102, is available in the transmission. The determining operation may include the reference signal processing module 2108 performing blind detection to determine the availability of the second set of RS. Alternatively, the determining operation may include the reference signal processing module 2108 receiving from an evolved Node B (eNB) 2150 information indicating whether the second set of RS is available or not.

The proximity information module 2114 may receive proximity information from the eNB 2150. The proximity information may include a propagation time difference of the first set of RS and the second set of RS. The channel/timing estimation module 2110 processes the received at least one resource block based on the first set of RS and further based on the second set of RS if the second set of RS is determined to be available. The processing may include performing channel estimation and/or timing estimation.

In an aspect, the first set of RS and the second set of RS are UE-specific RS (UE-RS) for demodulation. The first set of UE-RS and the second set of UE-RS may have a different precoding or the same precoding. The availability of the second set of UE-RS may be determined when the second set of UE-RS is contained within the at least one resource block. Alternatively, the availability of the second set of UE-RS may be determined when a resource block comprising the second set of UE-RS is associated with a same precoding resource block group (PRG) as the at least one resource block. In another aspect, the transmission may be for the apparatus 2102, the first set of UE-RS may be for the apparatus 2102, and the second set of UE-RS may be for another UE or no other UEs.

In a further aspect, the first set of RS and the second set of RS are channel state information reference signals (CSI-RS). The first set of CSI-RS and the second set of CSI-RS may be associated with different resources. Alternatively, the first set of CSI-RS and the second set of CSI-RS may be associated with a same set of resources but with different antenna ports. Moreover, the same precoding may be applied to a first set of CSI-RS ports and a second set of CSI-RS ports in a transmitted resource block.

In yet another aspect, the first set of RS may include UE-specific RS (UE-RS) for demodulation and the second set of RS may include channel state information reference signals (CSI-RS).

The apparatus may include additional modules that perform each of the steps of the algorithm in the aforementioned flow charts of FIGS. 12, 13, 15, 17, and 18. As such, each step in the aforementioned flow charts of FIGS. 12, 13, 15, 17, and 28 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 22:
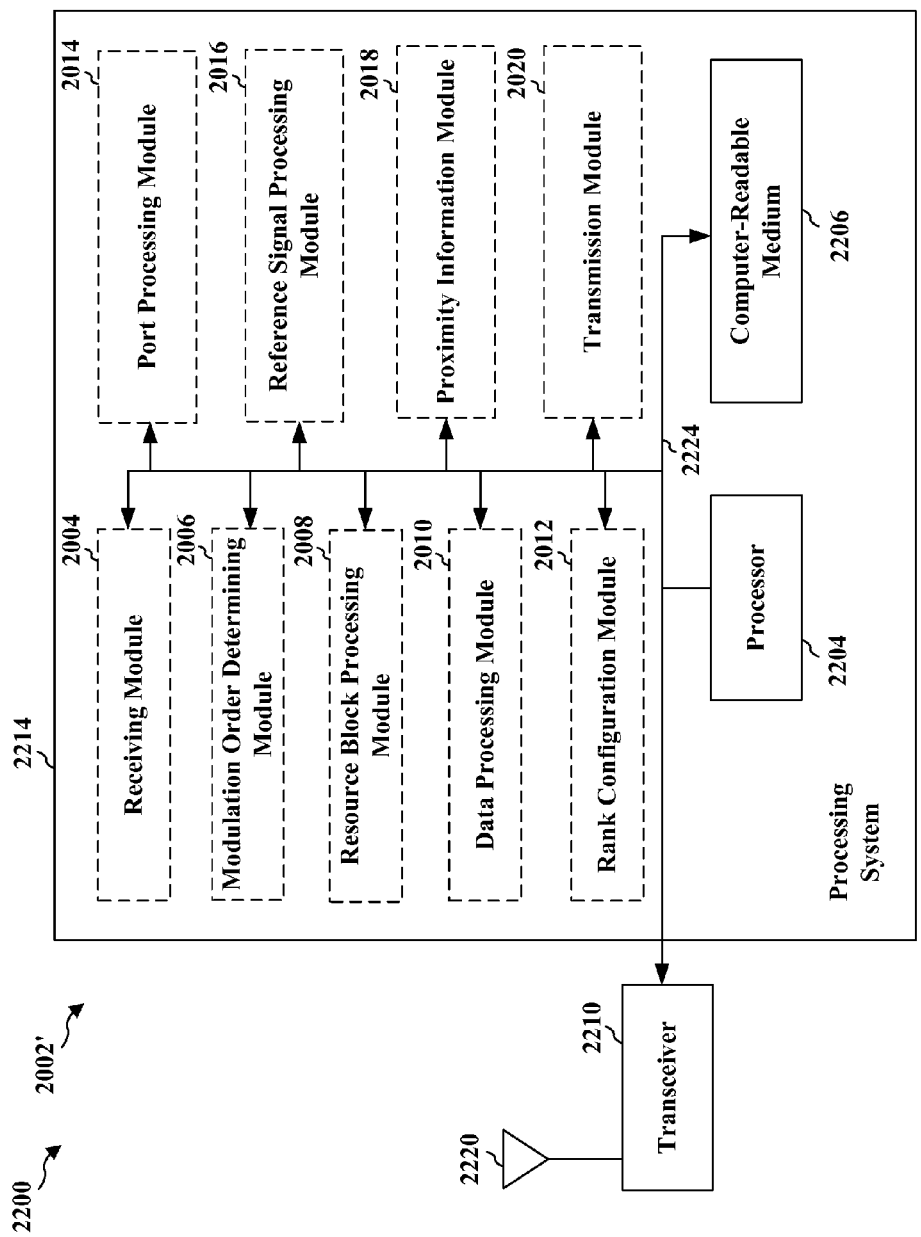
FIG. 22 is a diagram illustrating an example of a hardware implementation for an apparatus employing a processing system.

FIG. 22 is a diagram 2200 illustrating an example of a hardware implementation for an apparatus 2002' employing a processing system 2214. The processing system 2214 may be implemented with a bus architecture, represented generally by the bus 2224. The bus 2224 may include any number of interconnecting buses and bridges depending on the specific application of the processing system 2214 and the overall design constraints. The bus 2224 links together various circuits including one or more processors and/or hardware modules, represented by the processor 2204, the modules 2004, 2006, 2008, 2010, 2012, 2014, 2016, 2018, 2020, and the computer-readable medium 2206. The bus 2224 may also link various other circuits such as timing sources, peripherals, voltage regulators, and power management circuits, which are well known in the art, and therefore, will not be described any further.

The processing system 2214 may be coupled to a transceiver 2210. The transceiver 2210 is coupled to one or more antennas 2220. The transceiver 2210 provides a means for communicating with various other apparatus over a transmission medium. The transceiver 2210 receives a signal from the one or more antennas 2220, extracts information from the received signal, and provides the extracted information to the processing system 2214, specifically the receiving module 2004. In addition, the transceiver 2210 receives information from the processing system 2214, specifically the transmission module 2020, and based on the received information, generates a signal to be applied to the one or more antennas 2220. The processing system 2214 includes a processor 2204 coupled to a computer-readable medium 2206. The processor 2204 is responsible for general processing, including the execution of software stored on the computer-readable medium 2206. The software, when executed by the processor 2204, causes the processing system 2214 to perform the various functions described supra for any particular apparatus. The computer-readable medium 2206 may also be used for storing data that is manipulated by the processor 2204 when executing software. The processing system further includes at least one of the modules 2004, 2006, 2008, 2010, 2012, 2014, 2016, 2018, and 2020. The modules may be software modules running in the processor 2204, resident/stored in the computer readable medium 2206, one or more hardware modules coupled to the processor 2204, or some combination thereof. The processing system 2214 may be a component of the eNB 610 and may include the memory 676 and/or at least one of the TX processor 616, the RX processor 670, and the controller/processor 675.

In one configuration, the apparatus 2002/2002' for wireless communication includes means for restricting a number of resource blocks that can be allocated to a user equipment (UE) in a downlink assignment to be greater than or equal to N, where N is greater than one, means for transmitting a downlink transmission corresponding to the downlink assignment to the UE, means for determining a modulation order for the downlink transmission, wherein the means for restricting restricts the number of resource blocks based on the determined modulation order, means for configuring a user equipment (UE) to receive one of a rank one transmission or a rank two transmission, means for transmitting a resource block to the UE, the resource block comprising a first set of user equipment specific reference signals (UE-RS) and a second set of UE-RS, one of the first set of UE-RS and the second set of UE-RS being for the UE, the other one of the first set of UE-RS and the second set of UE-RS being for another UE or no other UEs, means for using the same precoding for the first set of UE-RS and the second set of UE-RS, means for using a different precoding for the first set of UE-RS and the second set of UE-RS, wherein said other one of the first set of UE-RS and the second set of UE-RS is for said another UE, means for determining to transmit the resource block with four antenna ports, means for selecting the four antenna ports to comprise antenna ports 7, 8, 11, and 13, wherein the antenna ports 7, 8, 11, and 13 provide a mapping of UE-RS to the first set of UE-RS, the first set of UE-RS being for the UE and the second set of UE-RS being for no other UEs, means for including the second set of UE-RS in the resource block to enable the UE to perform time tracking based on both the first set of UE-RS and the second set of UE-RS, means for selecting the four antenna ports to comprise antenna ports 9, 10, 12, and 14, wherein the antenna ports 9, 10, 12, and 14 provide a mapping of UE-RS to the second set of UE-RS, the second set of UE-RS being for the UE and the first set of UE-RS being for no other UEs, means for including the first set of UE-RS in the resource block to enable the UE to perform time tracking based on both the first set of UE-RS and the second set of UE-RS, means for configuring a user equipment (UE) to receive a first number of channel state information reference signal (CSI-RS) ports, means for transmitting to the UE a resource block comprising a second number of CSI-RS ports greater than the first number of CSI-RS ports, the second number of CSI-RS ports enabling improved time tracking by the UE, means for transmitting proximity information to the UE, the proximity information comprising one of a distance between the UE and the eNB and a distance between the UE and a second eNB, a propagation time from the eNB to the UE and from the second eNB to the UE, a relationship between the distance from the eNB and the second eNB, or a relationship between the propagation time from the eNB and the second eNB, means for transmitting a second resource block comprising CSI-RS ports corresponding to only a first configuration, wherein the first number of CSI-RS ports corresponds to the first configuration, and additional CSI-RS ports in the second number of CSI-RS ports as compared to the first number of CSI-RS ports corresponds to a second configuration, means for configuring a user equipment (UE) to receive a transmission, means for transmitting to the UE at least one resource block in the transmission, where the at least one resource block comprises a first set of reference signals (RS), specific to the UE, means for providing a second set of RS in the transmission, means for transmitting to the UE information indicating whether or not the second set of RS is available to the UE, means for transmitting to the UE proximity information, wherein the proximity information comprises a propagation time difference of the first set of RS and the second set of RS, and means for transmitting to the UE a configuration to receive the transmission using a transmission mode supporting cooperative multipoint (CoMP) transmission.

The aforementioned means may be one or more of the aforementioned modules of the apparatus 2002 and/or the processing system 2214 of the apparatus 2002' configured to perform the functions recited by the aforementioned means. As described supra, the processing system 2214 may include the TX Processor 616, the RX Processor 670, and the controller/processor 675. As such, in one configuration, the aforementioned means may be the TX Processor 616, the RX Processor 670, and the controller/processor 675 configured to perform the functions recited by the aforementioned means.

Figure 23:
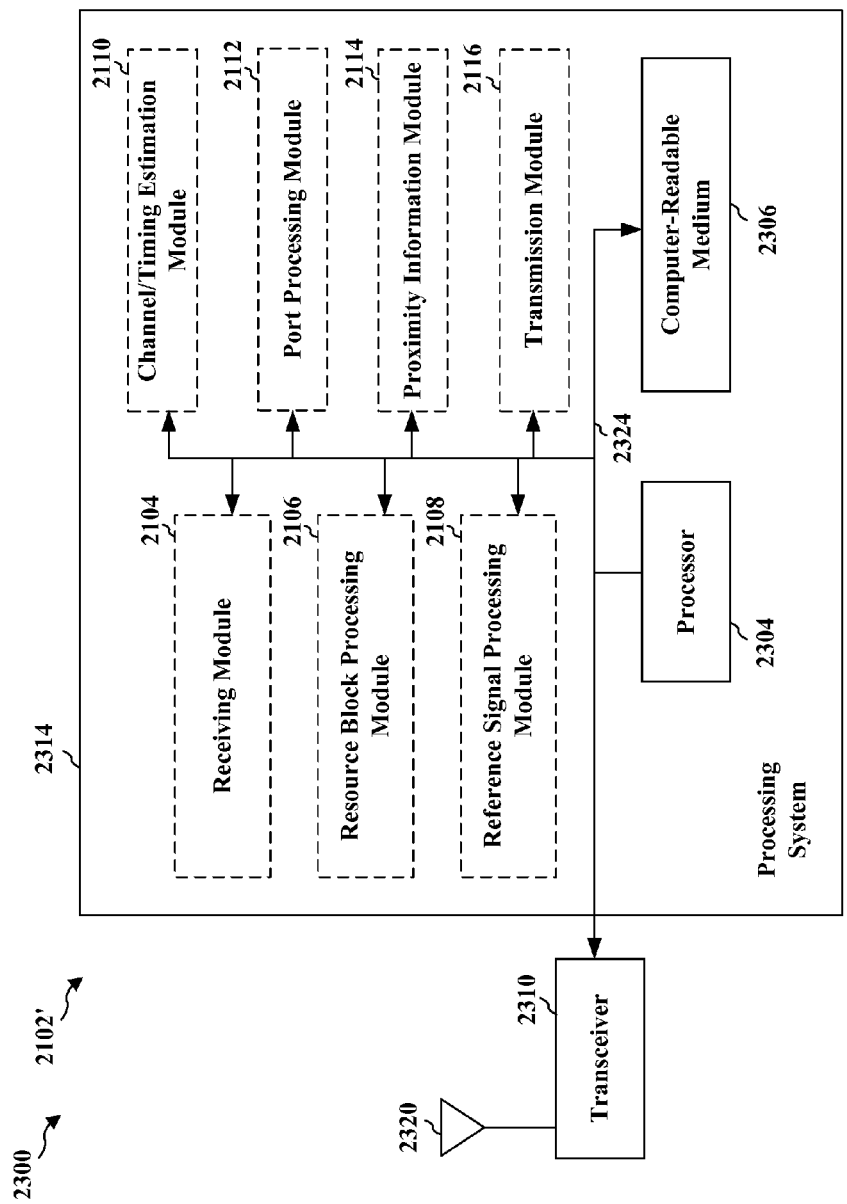
FIG. 23 is a diagram illustrating an example of a hardware implementation for an apparatus employing a processing system.

FIG. 23 is a diagram 2300 illustrating an example of a hardware implementation for an apparatus 2102' employing a processing system 2314. The processing system 2314 may be implemented with a bus architecture, represented generally by the bus 2324. The bus 2324 may include any number of interconnecting buses and bridges depending on the specific application of the processing system 2314 and the overall design constraints. The bus 2324 links together various circuits including one or more processors and/or hardware modules, represented by the processor 2304, the modules 2104, 2106, 2108, 2110, 2112, 2114, 2116, and the computer-readable medium 2306. The bus 2324 may also link various other circuits such as timing sources, peripherals, voltage regulators, and power management circuits, which are well known in the art, and therefore, will not be described any further.

The processing system 2314 may be coupled to a transceiver 2310. The transceiver 2310 is coupled to one or more antennas 2320. The transceiver 2310 provides a means for communicating with various other apparatus over a transmission medium. The transceiver 2310 receives a signal from the one or more antennas 2320, extracts information from the received signal, and provides the extracted information to the processing system 2314, specifically the receiving module 2104. In addition, the transceiver 2310 receives information from the processing system 2314, specifically the transmission module 2116, and based on the received information, generates a signal to be applied to the one or more antennas 2320. The processing system 2314 includes a processor 2304 coupled to a computer-readable medium 2306. The processor 2304 is responsible for general processing, including the execution of software stored on the computer-readable medium 2306. The software, when executed by the processor 2304, causes the processing system 2314 to perform the various functions described supra for any particular apparatus. The computer-readable medium 2306 may also be used for storing data that is manipulated by the processor 2304 when executing software. The processing system further includes at least one of the modules 2104, 2106, 2108, 2110, 2112, 2114, and 2116. The modules may be software modules running in the processor 2304, resident/stored in the computer readable medium 2306, one or more hardware modules coupled to the processor 2304, or some combination thereof. The processing system 2314 may be a component of the UE 650 and may include the memory 660 and/or at least one of the TX processor 668, the RX processor 656, and the controller/processor 659.

In one configuration, the apparatus 2102/2102' for wireless communication includes means for receiving a plurality of resource blocks in a transmission, the plurality of resource blocks comprising a precoding resource block group (PRG), means for decoding user equipment specific reference signals (UE-RS) based on an assumed same precoding for transmission of the resource blocks in the PRG, means for performing time tracking based on the decoded UE-RS in the PRG, means for receiving a configuration to receive the transmission using a transmission mode supporting cooperative multipoint (CoMP) transmission, means for receiving at least one resource block in a transmission, each of said at least one resource block comprising a first set of user equipment specific reference signals (UE-RS), means for determining whether a resource block of the at least one resource block comprises a second set of UE-RS, means for performing time tracking based on the first set of UE-RS and based on the second set of UE-RS when the resource block is determined to comprise the second set of UE-RS, means for receiving a configuration to receive at least one resource block with a first number of channel state information reference signal (CSI-RS) ports in each resource block of the at least one resource block, means for receiving the at least one resource block in a transmission, means for assuming a resource block of the at least one resource block comprises a second number of CSI-RS ports greater than the first number of CSI-RS ports, means for performing time tracking based on signals in resource elements corresponding to the assumed second number of CSI-RS ports, wherein the second number of CSI-RS ports comprise at least a first set of CSI-RS ports transmitted by a first evolved Node B (eNB) and a second set of CSI-RS ports transmitted by a second eNB, means for receiving proximity information from a serving eNB indicating one of a distance from each of the first eNB and the second eNB, a propagation time from each of the first eNB and the second eNB, a relationship between the distance from the first eNB and the second eNB, or a relationship between the propagation time from the first eNB and the second eNB, wherein the time tracking is performed further based on the received proximity information, means for receiving user equipment specific reference signals (UE-RS) and channel state information reference signals (CSI-RS) in at least one resource block, means for performing time tracking based on the received UE-RS and CSI-RS, means for receiving at least one resource block in a transmission, where the at least one resource block comprises a first set of reference signals (RS), specific to the UE, means for determining whether a second set of RS, specific to the UE, is available in the transmission, means for processing the received at least one resource block based on the first set of RS and further based on the second set of RS if determined available, means for receiving proximity information from an evolved Node B (eNB), wherein the proximity information comprises a propagation time difference of the first set of RS and the second set of RS, and means for receiving a configuration to receive the transmission using a transmission mode supporting cooperative multipoint (CoMP) transmission.

The aforementioned means may be one or more of the aforementioned modules of the apparatus 2102 and/or the processing system 2314 of the apparatus 2102' configured to perform the functions recited by the aforementioned means. As described supra, the processing system 2314 may include the TX Processor 668, the RX Processor 656, and the controller/processor 659. As such, in one configuration, the aforementioned means may be the TX Processor 668, the RX Processor 656, and the controller/processor 659 configured to perform the functions recited by the aforementioned means.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for.".

What is claimed is:

1. A method of wireless communication of a user equipment (UE), comprising:
   receiving at least one resource block in a transmission, where the at least one resource block comprises a first set of reference signals (RS), specific to the UE;
   determining whether a second set of RS, specific to the UE, is available in the transmission, wherein the determining comprises receiving from an evolved Node B (eNB) information indicating whether the second set of RS is available or not; and
   processing the received at least one resource block based on the first set of RS and further based on the second set of RS if determined available, wherein if it is determined that the second set of RS is available the processing comprises performing time tracking to update a downlink timing of a subframe based at least in part on the second set of RS.

2. The method of claim 1, wherein the processing comprises performing at least one of channel estimation or timing estimation.

3. The method of claim 1, wherein the first set of RS and the second set of RS are UE-specific RS (UE-RS) for demodulation.

4. The method of claim 3, wherein the availability of the second set of UE-RS is determined when the second set of UE-RS is contained within the at least one resource block.

5. The method of claim 3, wherein the availability of the second set of UE-RS is determined when a resource block comprising the second set of UE-RS is associated with a same precoding resource block group (PRG) as the at least one resource block.

6. The method of claim 3, wherein the transmission is for the UE, the first set of UE-RS is for the UE, and the second set of UE-RS is for another UE or no other UEs.

7. The method of claim 3, wherein the first set of UE-RS and the second set of UE-RS have a different precoding.

8. The method of claim 3, wherein the first set of UE-RS and the second set of UE-RS have the same precoding.

9. The method of claim 1, wherein the first set of RS and the second set of RS are channel state information reference signals (CSI-RS).

10. The method of claim 9, wherein the first set of CSI-RS and the second set of CSI-RS are associated with different resources.

11. The method of claim 9, wherein the first set of CSI-RS and the second set of CSI-RS are associated with a same set of resources but with different antenna ports.

12. The method of claim 9, wherein the same precoding is applied to a first set of CSI-RS ports and a second set of CSI-RS ports in a transmitted resource block.

13. The method of claim 1, wherein the first set of RS comprises UE-specific RS (UE-RS) for demodulation and the second set of RS comprises channel state information reference signals (CSI-RS).

14. The method of claim 1, further comprising receiving proximity information from an evolved Node B (eNB), wherein the proximity information comprises a propagation time difference of the first set of RS and the second set of RS.

15. The method of claim 1, further comprising receiving a configuration to receive the transmission using a transmission mode supporting cooperative multipoint (CoMP) transmission.

16. A method of wireless communication of an evolved Node B (eNB), comprising:

configuring a user equipment (UE) to receive a transmission;

transmitting to the UE at least one resource block in the transmission, where the at least one resource block comprises a first set of reference signals (RS), specific to the UE;

providing a second set of RS in the transmission; and transmitting to the UE information indicating whether or not the second set of RS is available to the UE, wherein the second set of RS is configured for use in performing time tracking to update a downlink timing of a subframe.

17. The method of claim 16, wherein the UE performs at least one of channel estimation or timing estimation based on the first set of RS and further based on the second set of RS if the second set of RS is available to the UE.

18. The method of claim 17, wherein the first set of RS and the second set of RS are UE-specific RS (UE-RS) for demodulation.

19. The method of claim 18, wherein the second set of UE-RS is available to the UE when the second set of UE-RS is contained within the at least one resource block.

20. The method of claim 18, wherein the second set of UE-RS is available to the UE when a resource block comprising the second set of UE-RS is associated with a same precoding resource block group (PRG) as the at least one resource block.

21. The method of claim 18, wherein the transmission is for the UE, the first set of UE-RS is for the UE, and the second set of UE-RS is for another UE or no other UEs.

22. The method of claim 18, wherein the first set of UE-RS and the second set of UE-RS have a different precoding.

23. The method of claim 18, wherein the first set of UE-RS and the second set of UE-RS have the same precoding.

24. The method of claim 17, wherein the first set of RS and the second set of RS are channel state information reference signals (CSI-RS).

25. The method of claim 24, wherein the first set of CSI-RS and the second set of CSI-RS are associated with different resources.

26. The method of claim 24, wherein the first set of CSI-RS and the second set of CSI-RS are associated with a same set of resources but with different antenna ports.

27. The method of claim 24, wherein the same precoding is applied to a first set of CSI-RS ports and a second set of CSI-RS ports in a transmitted resource block.

28. The method of claim 17, wherein the first set of RS comprises UE-specific RS (UE-RS) for demodulation and the second set of RS comprises channel state information reference signals (CSI-RS).

29. The method of claim 16, further comprising transmitting to the UE proximity information, wherein the proximity information comprises a propagation time difference of the first set of RS and the second set of RS.

30. The method of claim 16, further comprising transmitting to the UE a configuration to receive the transmission using a transmission mode supporting cooperative multipoint (CoMP) transmission.

31. A user equipment (UE), comprising:
means for receiving at least one resource block in a transmission, where the at least one resource block comprises a first set of reference signals (RS), specific to the UE;
means for determining whether a second set of RS, specific to the UE, is available in the transmission, wherein the means for determining is configured to receive from an evolved Node B (eNB) information indicating whether the second set of RS is available or not; and
means for processing the received at least one resource block based on the first set of RS and further based on the second set of RS if determined available, wherein if it is determined that the second set of RS is available the means for processing is configured to perform time tracking to update a downlink timing of a subframe based at least in part on the second set of RS.

32. The UE of claim 31, wherein the means for processing is configured to perform at least one of channel estimation or timing estimation.

33. The UE of claim 31, wherein the first set of RS and the second set of RS are UE-specific RS (UE-RS) for demodulation.

34. The UE of claim 33, wherein the availability of the second set of UE-RS is determined when the second set of UE-RS is contained within the at least one resource block.

35. The UE of claim 33, wherein the availability of the second set of UE-RS is determined when a resource block comprising the second set of UE-RS is associated with a same precoding resource block group (PRG) as the at least one resource block.

36. The UE of claim 33, wherein the transmission is for the UE, the first set of UE-RS is for the UE, and the second set of UE-RS is for another UE or no other UEs.

37. The UE of claim 33, wherein the first set of UE-RS and the second set of UE-RS have a different precoding.

38. The UE of claim 33, wherein the first set of UE-RS and the second set of UE-RS have the same precoding.

39. The UE of claim 31, wherein the first set of RS and the second set of RS are channel state information reference signals (CSI-RS).

40. The UE of claim 39, wherein the first set of CSI-RS and the second set of CSI-RS are associated with different resources.

41. The UE of claim 39, wherein the first set of CSI-RS and the second set of CSI-RS are associated with a same set of resources but with different antenna ports.

42. The UE of claim 39, wherein the same precoding is applied to a first set of CSI-RS ports and a second set of CSI-RS ports in a transmitted resource block.

43. The UE of claim 31, wherein the first set of RS comprises UE-specific RS (UE-RS) for demodulation and the second set of RS comprises channel state information reference signals (CSI-RS).

44. The UE of claim 31, further comprising means for receiving proximity information from an evolved Node B (eNB), wherein the proximity information comprises a propagation time difference of the first set of RS and the second set of RS.

45. The UE of claim 31, further comprising means for receiving a configuration to receive the transmission using a transmission mode supporting cooperative multipoint (CoMP) transmission.

46. An evolved Node B (eNB), comprising:
means for configuring a user equipment (UE) to receive a transmission;
means for transmitting to the UE at least one resource block in the transmission, where the at least one resource block comprises a first set of reference signals (RS), specific to the UE;
means for providing a second set of RS in the transmission; and
means for transmitting to the UE information indicating whether or not the second set of RS is available to the UE, wherein the second set of RS is configured for use in performing time tracking to update a downlink timing of a subframe.

47. The eNB of claim 46, wherein the UE performs at least one of channel estimation or timing estimation based on the first set of RS and further based on the second set of RS if the second set of RS is available to the UE.

48. The eNB of claim 47, wherein the first set of RS and the second set of RS are UE-specific RS (UE-RS) for demodulation.

49. The eNB of claim 48, wherein the second set of UE-RS is available to the UE when the second set of UE-RS is contained within the at least one resource block.

50. The eNB of claim 48, wherein the second set of UE-RS is available to the UE when a resource block comprising the second set of UE-RS is associated with a same precoding resource block group (PRG) as the at least one resource block.

51. The eNB of claim 48, wherein the transmission is for the UE, the first set of UE-RS is for the UE, and the second set of UE-RS is for another UE or no other UEs.

52. The eNB of claim 48, wherein the first set of UE-RS and the second set of UE-RS have a different precoding.

53. The eNB of claim 48, wherein the first set of UE-RS and the second set of UE-RS have the same precoding.

54. The eNB of claim 47, wherein the first set of RS and the second set of RS are channel state information reference signals (CSI-RS).

55. The eNB of claim 54, wherein the first set of CSI-RS and the second set of CSI-RS are associated with different resources.

56. The eNB of claim 54, wherein the first set of CSI-RS and the second set of CSI-RS are associated with a same set of resources but with different antenna ports.

57. The eNB of claim 54, wherein the same precoding is applied to a first set of CSI-RS ports and a second set of CSI-RS ports in a transmitted resource block.

58. The eNB of claim 47, wherein the first set of RS comprises UE-specific RS (UE-RS) for demodulation and the second set of RS comprises channel state information reference signals (CSI-RS).

59. The eNB of claim 46, further comprising means for transmitting to the UE proximity information, wherein the proximity information comprises a propagation time difference of the first set of RS and the second set of RS.

60. The eNB of claim 46, further comprising means for transmitting to the UE a configuration to receive the transmission using a transmission mode supporting cooperative multipoint (CoMP) transmission.

61. A user equipment (UE), comprising:
a memory; and
a processing system coupled to the memory and configured to:
receive at least one resource block in a transmission, where the at least one resource block comprises a first set of reference signals (RS), specific to the UE;
determine whether a second set of RS, specific to the UE, is available in the transmission, wherein the processing system configured to determine is further configured to receive from an evolved Node B (eNB) information indicating whether the second set of RS is available or not; and
process the received at least one resource block based on the first set of RS and further based on the second set of RS if determined available, wherein if it is determined that the second set of RS is available the processing system is configured to process the at least one resource block by performing time tracking to update a downlink timing of a subframe based at least in part on the second set of RS.

62. The UE of claim 61, wherein the processing system configured to process is further configured to perform at least one of channel estimation or timing estimation.

63. The UE of claim 61, wherein the first set of RS and the second set of RS are UE-specific RS (UE-RS) for demodulation.

64. The UE of claim 63, wherein the availability of the second set of UE-RS is determined when the second set of UE-RS is contained within the at least one resource block.

65. The UE of claim 63, wherein the availability of the second set of UE-RS is determined when a resource block comprising the second set of UE-RS is associated with a same precoding resource block group (PRG) as the at least one resource block.

66. The UE of claim 63, wherein the transmission is for the UE, the first set of UE-RS is for the UE, and the second set of UE-RS is for another UE or no other UEs.

67. The UE of claim 63, wherein the first set of UE-RS and the second set of UE-RS have a different precoding.

68. The UE of claim 63, wherein the first set of UE-RS and the second set of UE-RS have the same precoding.

69. The UE of claim 61, wherein the first set of RS and the second set of RS are channel state information reference signals (CSI-RS).

70. The UE of claim 69, wherein the first set of CSI-RS and the second set of CSI-RS are associated with different resources.

71. The UE of claim 69, wherein the first set of CSI-RS and the second set of CSI-RS are associated with a same set of resources but with different antenna ports.

72. The UE of claim 69, wherein the same precoding is applied to a first set of CSI-RS ports and a second set of CSI-RS ports in a transmitted resource block.

73. The UE of claim 61, wherein the first set of RS comprises UE-specific RS (UE-RS) for demodulation and the second set of RS comprises channel state information reference signals (CSI-RS).

74. The UE of claim 61, the processing system further configured to receive proximity information from an evolved Node B (eNB), wherein the proximity information comprises a propagation time difference of the first set of RS and the second set of RS.

75. The UE of claim 61, the processing system further configured to receive a configuration to receive the transmission using a transmission mode supporting cooperative multipoint (CoMP) transmission.

76. An evolved Node B (eNB), comprising:
a memory; and
a processing system coupled to the memory and configured to:
configure a user equipment (UE) to receive a transmission;
transmit to the UE at least one resource block in the transmission, where the at least one resource block comprises a first set of reference signals (RS), specific to the UE;
provide a second set of RS in the transmission; and
transmit to the UE information indicating whether or not the second set of RS is available to the UE, wherein the second set of RS is configure for use in performing time tracking to update a downlink timing of a subframe.

77. The eNB of claim 76, wherein the UE performs at least one of channel estimation or timing estimation based on the first set of RS and further based on the second set of RS if the second set of RS is available to the UE.

78. The eNB of claim 77, wherein the first set of RS and the second set of RS are UE-specific RS (UE-RS) for demodulation.

79. The eNB of claim 78, wherein the second set of UE-RS is available to the UE when the second set of UE-RS is contained within the at least one resource block.

80. The eNB of claim 78, wherein the second set of UE-RS is available to the UE when a resource block comprising the second set of UE-RS is associated with a same precoding resource block group (PRG) as the at least one resource block.

81. The eNB of claim 78, wherein the transmission is for the UE, the first set of UE-RS is for the UE, and the second set of UE-RS is for another UE or no other UEs.

82. The eNB of claim 78, wherein the first set of UE-RS and the second set of UE-RS have a different precoding.

83. The eNB of claim 78, wherein the first set of UE-RS and the second set of UE-RS have the same precoding.

84. The eNB of claim 77, wherein the first set of RS and the second set of RS are channel state information reference signals (CSI-RS).

85. The eNB of claim 84, wherein the first set of CSI-RS and the second set of CSI-RS are associated with different resources.

86. The eNB of claim 84, wherein the first set of CSI-RS and the second set of CSI-RS are associated with a same set of resources but with different antenna ports.

87. The eNB of claim 84, wherein the same precoding is applied to a first set of CSI-RS ports and a second set of CSI-RS ports in a transmitted resource block.

88. The eNB of claim 77, wherein the first set of RS comprises UE-specific RS (UE-RS) for demodulation and the second set of RS comprises channel state information reference signals (CSI-RS).

89. The eNB of claim 76, the processing system further configured to transmit to the UE proximity information, wherein the proximity information comprises a propagation time difference of the first set of RS and the second set of RS.

90. The eNB of claim 76, the processing system further configured to transmit to the UE a configuration to receive the transmission using a transmission mode supporting cooperative multipoint (CoMP) transmission.

91. A non-transitory computer-readable medium storing computer executable code for wireless communication, comprising code for:
receiving at least one resource block in a transmission, where the at least one resource block comprises a first set of reference signals (RS), specific to the UE;
determining whether a second set of RS, specific to the UE, is available in the transmission, wherein the determining comprises receiving from an evolved Node B (eNB) information indicating whether the second set of RS is available or not; and
processing the received at least one resource block based on the first set of RS and further based on the second set of RS if determined available, wherein if it is determined that the second set of RS is available the processing comprises performing time tracking to update a downlink timing of a subframe based at least in part on the second set of RS.

92. A non-transitory computer-readable medium storing computer executable code for wireless communication, comprising code for:
configuring a user equipment (UE) to receive a transmission;
transmitting to the UE at least one resource block in the transmission, where the at least one resource block comprises a first set of reference signals (RS), specific to the UE;
providing a second set of RS in the transmission; and
transmitting to the UE information indicating whether or not the second set of RS is available to the UE,
wherein the UE performs at least one of channel estimation or timing estimation based on the first set of RS and further based on the second set of RS if the second set of RS is available to the UE, and
wherein the second set of RS is configured for use in performing time tracking to update a downlink timing of a subframe.

93. The method of claim 1, wherein the first set of RS and the second set of RS are both received in a same resource block.

94. The method of claim 16, wherein the first set of RS and the second set of RS are both transmitted in a same resource block.

95. The UE of claim 31, wherein the first set of RS and the second set of RS are both received in a same resource block.

96. The eNB of claim 46, wherein the first set of RS and the second set of RS are both transmitted in a same resource block.

97. The UE of claim 61, wherein the first set of RS and the second set of RS are both received in a same resource block.

98. The eNB of claim 76, wherein the first set of RS and the second set of RS are both transmitted in a same resource block.

* * * * *